(12) United States Patent
Satpathy et al.

(10) Patent No.: US 11,263,353 B2
(45) Date of Patent: Mar. 1, 2022

(54) MIXED SEQUENCING OF POLYNOMIAL-DIVERSE ENCRYPTION AND DECRYPTION OPERATIONS FOR SIDE CHANNEL ATTACK PROTECTION

(71) Applicant: Facebook Technologies, LLC, Menlo Park, CA (US)

(72) Inventors: Sudhir Satpathy, Redmond, WA (US); Wojciech Stefan Powiertowski, Kirkland, WA (US); Neeraj Upasani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/835,063

(22) Filed: Mar. 30, 2020

(65) Prior Publication Data
US 2021/0182437 A1 Jun. 17, 2021

Related U.S. Application Data

(60) Provisional application No. 62/946,875, filed on Dec. 11, 2019.

(51) Int. Cl.
*G06F 21/75* (2013.01)
*G06F 21/72* (2013.01)
*H04L 9/06* (2006.01)

(52) U.S. Cl.
CPC .............. *G06F 21/75* (2013.01); *G06F 21/72* (2013.01); *H04L 9/0631* (2013.01)

(58) Field of Classification Search
CPC ....... G06F 21/75; G06F 21/72; H04L 9/0631; H04L 2209/04; H04L 9/003; H04L 2209/08
See application file for complete search history.

(56) References Cited

U.S. PATENT DOCUMENTS

| | | | |
|---|---|---|---|
| 8,346,839 B2* | 1/2013 | Ozturk | G06F 9/30007 708/620 |
| 10,554,387 B2* | 2/2020 | Gueron | G06F 9/30007 |

(Continued)

OTHER PUBLICATIONS

"SMS4 Encryption Algorithm for Wireless Networks V. 103"—Diffie et al, Sun Microsystems & Sonoma State University, May 15, 2008 https://eprint.iacr.org/2008/329.pdf (Year: 2008).*

(Continued)

*Primary Examiner* — Randy A Scott
(74) *Attorney, Agent, or Firm* — Shumaker & Sieffert, P.A.

(57) ABSTRACT

This disclosure describes systems on a chip (SOCs) that prevent side channel attacks (SCAs). An example SoC of this disclosure includes an engine configured to encrypt transmission (Tx) channel data using an encryption operation set configured with a first polynomial, and to decrypt encrypted received (Rx) channel data using a decryption operation set configured with a second polynomial different from the first polynomial. The SoC further includes a security processor configured to multiplex the encryption operation set against the decryption operation set with a varied sequence of selection inputs on a round-by-round basis to generate a mixed sequence of encryption rounds and decryption rounds, and to control the engine to encrypt the Tx channel data and decrypt the encrypted Rx channel data in a combined datapath according to the mixed sequence of encryption rounds and decryption rounds.

19 Claims, 19 Drawing Sheets

(56) References Cited

U.S. PATENT DOCUMENTS

| | | | | |
|---|---|---|---|---|
| 2014/0351896 A1* | 11/2014 | Koo | .................... | G02B 27/017 |
| | | | | 726/4 |
| 2017/0054559 A1* | 2/2017 | Melzer | ............... | H04N 21/4405 |
| 2018/0150831 A1* | 5/2018 | Dolan | .................. | G06Q 20/367 |
| 2019/0386815 A1* | 12/2019 | Satpathy | .................. | G06F 7/00 |

OTHER PUBLICATIONS

"A Case Study of Security and Privacy Threats from Augmented Reality"—Chen et al Binghampton University, Mar. 11, 2018 https://www.cs.uml.edu/~xinwenfu/paper/Conferences/18_ICNC_CIS_A_Case_Study_of_Security_and_Privacy_Threats_from_Augmented_Reality.pdf (Year: 2018).*

"Announcing the Advanced Encryption Standard (AES)," Federal Information Processing Standards Publication 197, Nov. 26, 2001, 51 pp.

"SMS4 Encryption Algorithm for Wireless Networks," Version 1.03, May 15, 2008, 6 pp. (translated by Diffie et al.).

Aoki et al., "Specification of Camellia—a 128-bit Block Cipher," NTT and Mitsubishi Electric Corporation, Sep. 26, 2001, 35 pp.

U.S. Appl. No. 16/506,618, filed Jul. 9, 2019, by Atlas et al.

\* cited by examiner

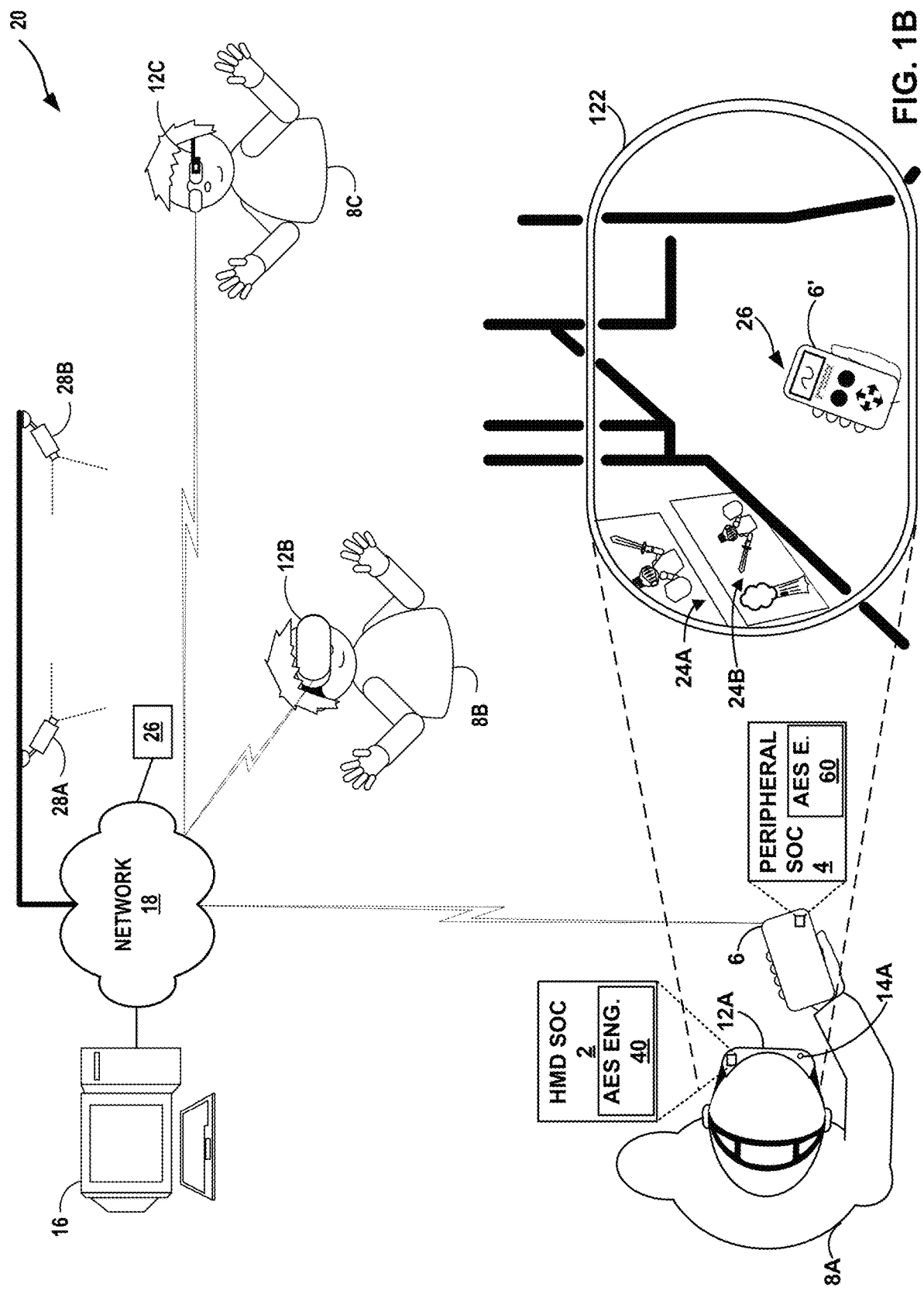

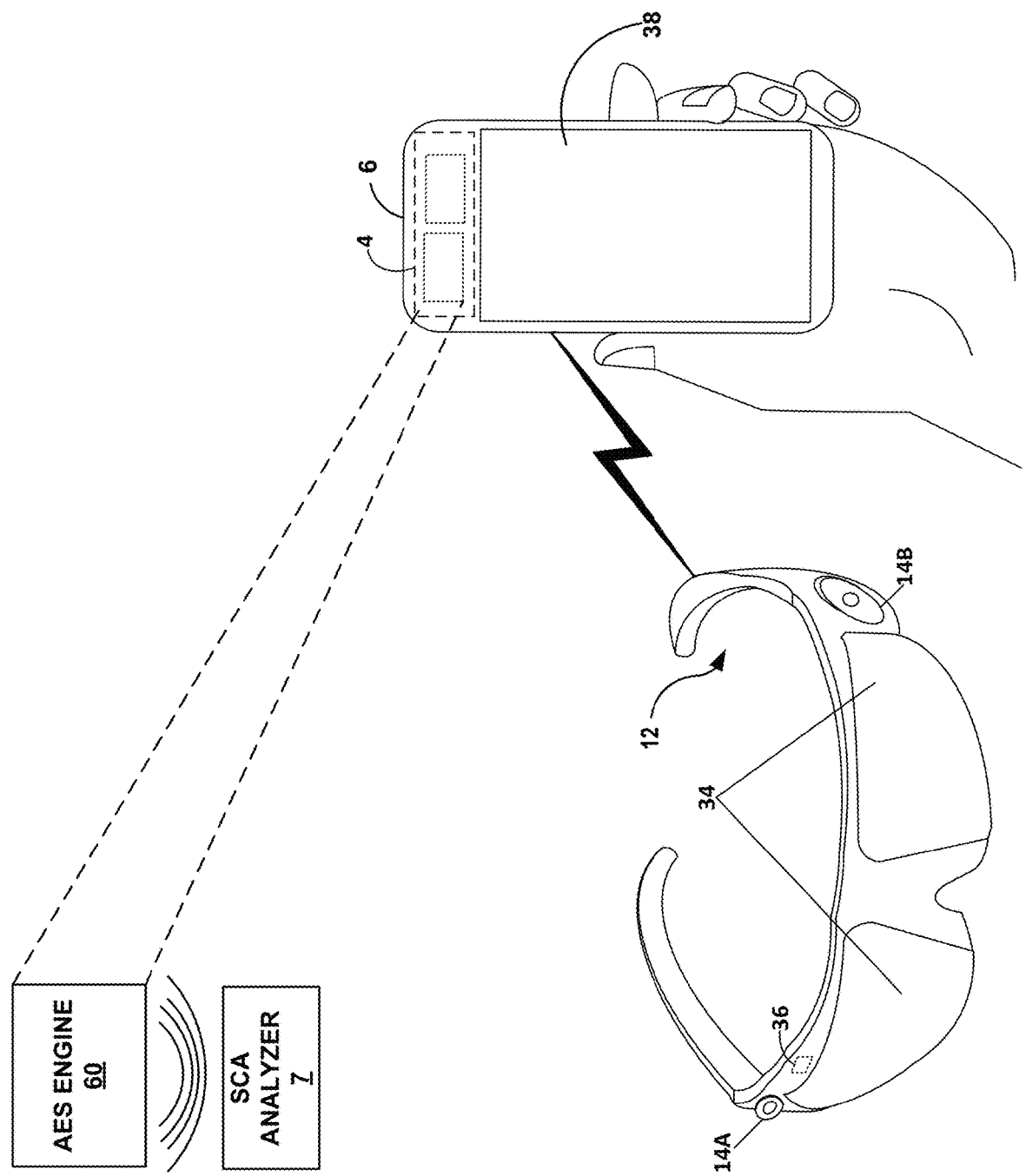

| | 0 | 1 | 2 | 3 | • • | • • | e | f |
|---|---|---|---|---|---|---|---|---|
| f | 76 | c0 | 15 | d4 | • • | • • | 89 | 21 |
| • | dc | 90 | 48 | f3 | • • | • • | 33 | a3 |
| 3 | 7b | 90 | 48 | cd | • • | • • | 7b | c4 |
| 2 | 77 | 90 | 48 | 93 | • • | • • | 6a | 7a |
| 1 | 7c | 90 | 48 | 32 | • • | • • | 45 | 91 |
| 0 | 63 | ca | b7 | 04 | • • | • • | e1 | d1 |

LUT(256×8b)

FIG. 12A

| | AES |
|---|---|
| Field | $GF(2^8)$ |
| Sbox | $A.x^{-1} + C$ |
| Inv. Sbox | $(A^{-1}.x + A^{-1}.C)^{-1}$ |
| Sbox/rnd | 16 |
| Sbox/key | 4 |

FIG. 12C

MIXED SEQUENCING OF POLYNOMIAL-DIVERSE ENCRYPTION AND DECRYPTION OPERATIONS FOR SIDE CHANNEL ATTACK PROTECTION

This application claims the benefit of U.S. Provisional Patent Application No. 62/946,875 filed on 11 Dec. 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

Some devices that perform encryption and/or decryption are standalone devices that are relatively portable and battery-powered. These features make these devices relatively vulnerable to attack or snooping mechanisms that rely on gleaning information about hardware-based encryption/decryption functions of these devices. An example of such an attack mechanism is a so-called "side channel attack" or SCA. SCAs exploit one or more of timing information, electronic current (charge flow) information, power consumption data, electromagnetic traces and leaks, emitted sounds, etc. exhibited by the device. In general, this disclosure describes devices that include a combined encryption/decryption engine (an "integrated engine" or "hybrid engine") configured to perform the overall combination of encryption and decryption in an SCA-resistant manner.

As one example, artificial reality systems often utilize one or more electronic devices that perform encryption and/or decryption. In general, artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

As described herein, typical artificial reality systems include one or more devices for rendering and displaying content to users. Some artificial reality systems incorporate a head-mounted display (HMD) and a peripheral device that are communicatively coupled and function as co-processing devices within the artificial reality system. The HMD is typically worn by a user and configured to output artificial reality content to the user. The peripheral device typically has a form factor similar to that of a handheld mobile computing device, such as a smartphone or personal digital assistant (PDA), and is held in the user's hand. Artificial reality content may represent completely generated content, or a combination of generated content with captured content (e.g., real-world video and/or images).

For portability and other reasons, user-facing artificial reality modalities (e.g., HMDs) and co-processing devices (e.g., peripheral devices in communication with HMDs) are battery-powered, and are therefore often designed for low-power operation. The low-power designs and portable form factors of HMDs and peripheral devices make these devices particularly vulnerable to SCAs, which are often performed using non-invasive, accessible, and relatively cheap off-the-shelf hacking equipment, such as SCA boards, trace analysis software, etc.

In general, this disclosure describes HMDs and peripheral devices that include a combined encryption/decryption engine (an "integrated engine" or "hybrid engine") configured to perform the overall combination of encryption and decryption in an SCA-resistant manner. The hybrid engine performs encryption and decryption using a consolidated multi-round datapath, in that encryption and decryption are each performed in an iterative way such that the results from one round of computations are fed back into the datapath to be used in the subsequent round of computations. In some examples, control logic of this disclosure causes the hybrid engine to switch between operating an encryption round and operating a decryption round within the multi-round datapath operated by the hybrid encryption/decryption engine. Control logic of this disclosure may control the hybrid engine to generate a mixed sequence of encryption rounds and decryption rounds on a random basis, a pseudo-random basis, a deterministic basis, or in other ways that yield a mixed sequence of encryption rounds and decryption rounds.

For example, control logic of this disclosure may multiplex encryption and decryption operations of the hybrid engine on a per-round basis such that encryption rounds and decryption rounds are executed on a staggered and interleaved basis. By varying selection inputs provided to the multiplexer logic, the control logic of this disclosure generates a mixed sequence of encryption rounds and decryption rounds. Again, the control logic may provide selection inputs to the multiplexer logic on a random, pseudo-random, deterministic, or other basis to generate the overall mixed sequences of encryption rounds and decryption rounds. In some examples, the control logic may vary the selection input sequence in a non-static way to increase the unpredictability of the power profile toggling over the mixed sequence of encryption and decryption rounds executed in the combined datapath. In this way, a subset of rounds of a multi-round encryption operation set are randomly interleaved with a subset of rounds of a multi-round decryption operation set.

Example control logic described in this disclosure executes the encryption operation set and the decryption operation set using different underlying polynomials at any given time. When executed using different underlying polynomials, the encryption operation set and decryption operation set consume different amounts of power regardless of whether or not they use matching or different keys, and therefore, exhibit disparate power profiles. By randomly interleaving encryption rounds and decryption rounds executed using different underlying polynomials, the hybrid engine of this disclosure obfuscates the overall power trace signature exhibited by the device by jumbling rounds with different power profiles, thereby scrambling the overall attack surface exposed to SCA equipment.

This disclosure focuses on encryption and decryption in the context of encrypted data communications between an HMD and peripheral device of an artificial reality system. However, it will be appreciated that the technical improvements of the configurations described in this disclosure may be incorporated into other types of systems that perform encryption and decryption, as well.

In one example, this disclosure is directed to an SoC that includes an engine and a security processor. The engine is configured to encrypt transmission (Tx) channel data using a multi-round encryption datapath operation set configured with a first polynomial, and to decrypt encrypted received (Rx) channel data using a decryption operation set configured with a second polynomial that is different from the first polynomial. The security processor is configured to multiplex the encryption operation set datapath against the decryption operation set with a varied sequence of selection inputs on a round-by-round basis to generate a mixed sequence of encryption rounds and decryption rounds, and to control the engine to encrypt the Tx channel data and decrypt the encrypted Rx channel data in a combined datapath according to the mixed sequence of encryption rounds and decryption rounds.

In another example, this disclosure is directed to an HMD that includes an SoC and an interface coupled to the SoC. The SoC includes an engine and a security processor. The engine is configured to encrypt transmission (Tx) channel data using an encryption operation set configured with a first polynomial, and to decrypt encrypted received (Rx) channel data using a decryption operation set configured with a second polynomial that is different from the first polynomial. The security processor is configured to multiplex the encryption operation set against the decryption operation set with a varied sequence of selection inputs on a round-by-round basis to generate a mixed sequence of encryption rounds and decryption rounds, and to control the engine to encrypt the Tx channel data and decrypt the encrypted Rx channel data in a combined datapath according to the mixed sequence of encryption rounds and decryption rounds. The interface is configured to transmit the Tx traffic, and to receive the encrypted Rx traffic.

In another example, this disclosure is directed to a peripheral device that includes an SoC and an interface coupled to the SoC. The SoC includes an engine and a security processor. The engine is configured to encrypt transmission (Tx) channel data using a multi-round encryption datapath configured with a first polynomial, and to decrypt encrypted received (Rx) channel data using a multi-round decryption datapath configured with a second polynomial that is different from the first polynomial. The security processor is configured to multiplex the multi-round encryption datapath against the multi-round decryption datapath on a round-by-round basis to generate a mixed sequence of encryption rounds and decryption rounds, and to control the engine to encrypt the Tx channel data and decrypt the encrypted Rx channel data according to the mixed sequence of encryption rounds and decryption rounds. The interface is configured to transmit the Tx traffic, and to receive the encrypted Rx traffic.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system that includes components configured to implement the SCA-prevention techniques of this disclosure.

FIG. 2C is an illustration depicting an example of a peripheral device configured to encrypt input data, and to decrypt and render encrypted artificial reality content in an SCA-resistant manner in accordance with the techniques of the disclosure.

FIGS. 12A-12C illustrate aspects of advanced encryption standard-specified byte substitution and inverse byte substitution operations, which is LUT-based.

DETAILED DESCRIPTION

Figure 1A:
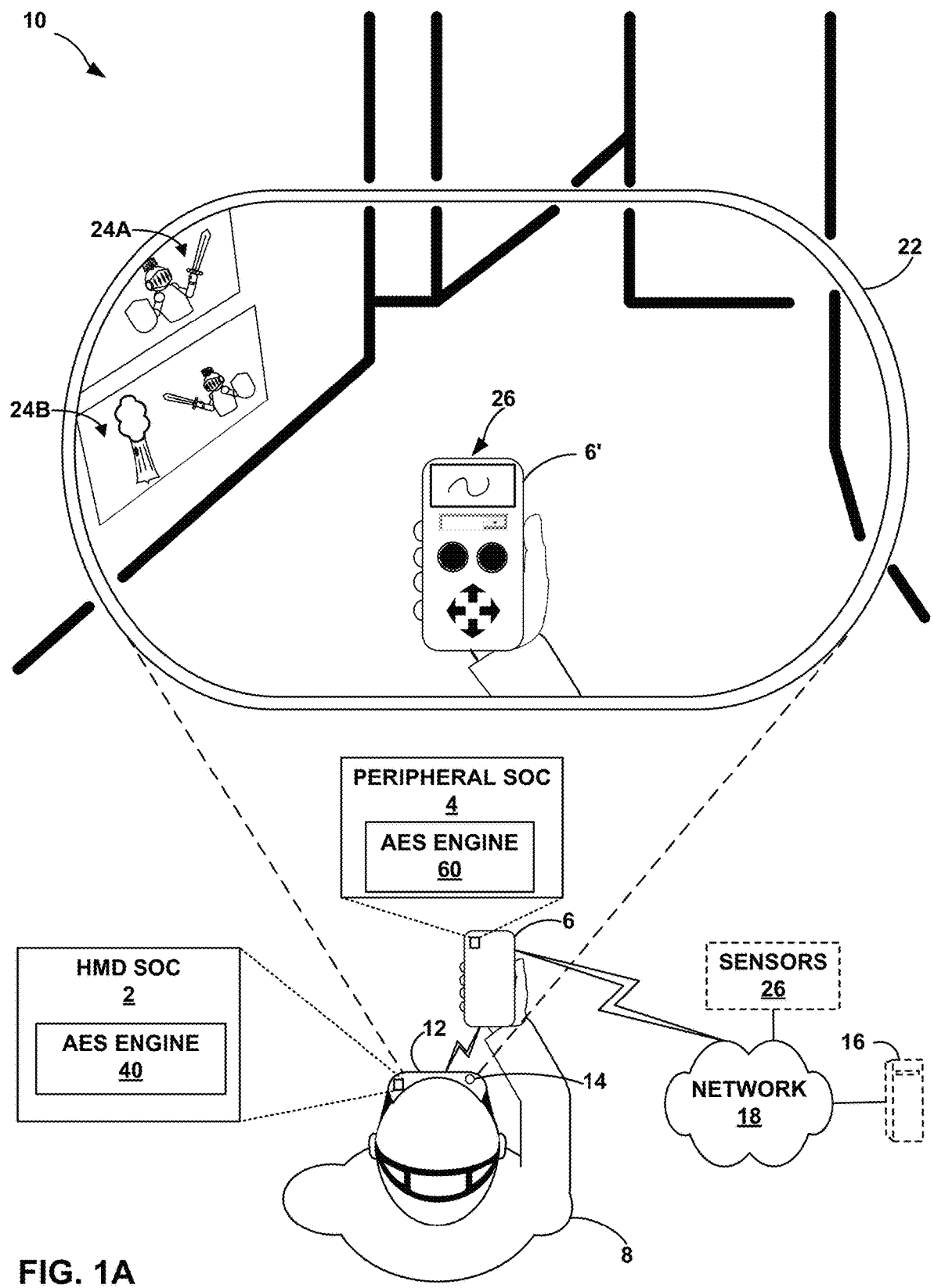
FIG. 1A is an illustration depicting an example multi-device artificial reality system of this disclosure, components of which are configured to thwart SCAs by encrypting input data and decrypting encrypted digital content in accordance with aspects of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of multi-device artificial reality systems.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Typical artificial reality systems include one or more devices for rendering and displaying content to users. As one example, an artificial reality system may incorporate a head-mounted device (HMD) worn by a user and configured to output artificial reality content to the user. In some artificial reality systems, the HMD is communicatively coupled to a peripheral device, which may, in some examples, have a form factor similar to those of common handheld devices, such as a smartphone. The artificial reality content may include completely generated content or generated content combined with captured content (e.g., real-world video and/or real-world images). Many components of artificial reality systems, such as HMDs and peripheral devices, are battery powered. In these examples, HMDs and peripheral devices tend to be designed for low-power operation. The low-power designs and portable nature of HMDs and peripheral devices make HMDs and peripheral devices particularly vulnerable to SCAs. SCAs are often performed using non-invasive, accessible, and relatively cheap off-the-shelf hacking equipment, such as SCA boards, trace analysis software, etc.

FIG. 1A is an illustration depicting an example multi-device artificial reality system 10, components of which are configured to thwart SCAs by encrypting input data and decrypting encrypted digital content in accordance with aspects of this disclosure. Components of multi-device artificial reality system 10, such as head-mounted device worn by a user and/or a peripheral device that functions as a co-processing device with the head-mounted device, are configured to cross-obfuscate encryption-based and decryption-based power trace signatures during randomly interleaved rounds of a multi-round encryption operation set and a multi-round decryption operation set, with the two operation sets being configured to operate using different underlying polynomials. The head-mounted device and/or the peripheral device of multi-device artificial reality system 10 may incorporate a hybrid engine that is configured to interleave encryption rounds that use one underlying polynomial with decryption rounds that use another (different) underlying polynomial in random, pseudo-random, or deterministic way, in accordance with aspects of this disclosure.

By interleaving polynomial-diverse rounds in a random, pseudo-random, or deterministic way, the components of multi-device artificial reality system 10 generate a mixed sequence of rounds that consume different amounts of power. That is, control logic of this disclosure intersperses the overall power trace signature exhibited by the device into which the hybrid engine is integrated with disparate power traces while decrypting ingress crypto packet payloads and encrypting egress crypto packet payloads. In this way, the techniques of this disclosure provide SCA protection to both the data being encrypted by the hybrid engine and the data being decrypted by the hybrid engine, while maintaining encryption and decryption precision and (in standards-based examples), standard-compliance. The overall power trace signature output by the individual component(s) of multi-device artificial reality system 10 is scrambled due to polynomial-diverse (and therefore, power profile-diverse) rounds being interspersed throughout the overall power trace signature exhibited.

Multi-device artificial reality system 10 includes a head-mounted device (HMD) 12 and a peripheral device 6. As shown, HMD 12 is typically worn by a user 8. HMD 12 typically includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4.

To encrypt egress data before transmission to peripheral SoC 4 and to decrypt ingress data after receipt from peripheral SoC 4, HMD SoC 2 invokes AES engine 40. To encrypt egress data before transmission to HMD SoC 2 and to decrypt ingress data after receipt from HMD SoC 2, peripheral SoC 4 invokes AES engine 60. As one example, HMD SoC 2 may encrypt facial images, retina scans, iris scans, etc. of user 8 (e.g., as captured by inward-facing camera hardware and/or fundal photography hardware of image capture devices 14), and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8. AES engine 40 represents a hybrid engine configured to perform encryption and decryption operations within an integrated silicon hardware infrastructure, in accordance with aspects of this disclosure. AES engine 60 represents another hybrid engine configured to perform encryption and decryption operations within an integrated silicon hardware infrastructure, in accordance with aspects of this disclosure.

AES engines 40, 60 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, include encryption/decryption engines that implement the SCA-resistance enhancements of this disclosure while complying with other cipher standards, such as SM4 (formerly SMS4, a block cipher standard set forth in the Chinese National Standard for Wireless LAN WAPI), *Camellia* (developed by Mitsubishi Electric and NTT Corporation of Japan), etc. The techniques of this disclosure can be implemented in digital logic, and are therefore sufficiently scalable and polymorphic to provide SCA resistance within the compliance boundaries of various types of encryption and decryption engines, such as those that comply with the standards listed above and other standardized or non-standardized encryption engines and/or decryption engines.

While the SCA resistance-enhancing techniques of this disclosure are described with respect to being implemented within multi-device artificial reality system 10 as an example, it will be appreciated that the applicability of the techniques of this disclosure are not limited to artificial reality systems. The data communication techniques of this disclosure can also be implemented to improve data security in other types of computing devices, including, but not limited to, various types of battery-powered SoC-driven and/or application specific integrated circuit (ASIC)-driven technologies.

AES engines 40 and 60 are configured to obfuscate or conceal the current leakage information by decorrelating the data processed through their respective encryption and decryption operation sets from their respective power signatures using one or more of the techniques described in this disclosure. AES engine 40 represents hybrid encryption/decryption hardware configured to encrypt egress (or "Tx channel") data and decrypt ingress (or "Rx channel") data in an integrated silicon infrastructure. According to aspects of this disclosure, control logic of AES engine 40 multiplexes parallel encryption and decryption operation sets on a round-by-round basis, while ensuring that the parallelized encryption operation set and decryption operation set use different polynomials at any given time.

In this way, AES engine 40 switches between executing AES rounds that exhibit varying power profiles on a random, pseudo-random, or deterministic basis, thereby executing a mixed sequence of power profile-diverse AES rounds. By switching between AES rounds with disparate power profiles on a random, pseudo-random, or deterministic basis, AES engine 40 generates an overall power trace that corresponds to a mixed sequence of AES rounds exhibiting jumbled power trace information, thereby scrambling the overall attack surface exposed by HMD 12 corresponding to both the encryption and decryption data-key pairs. AES engine 60 may perform similar operations to those described above with respect to AES engine 40, to scramble the overall attack surface exposed by peripheral device 6 corresponding to both the encryption and decryption data-key pairs.

The SCA-prevention techniques of this disclosure take advantage of the power trace signature obfuscation effects of polynomial diversity among a sequence of AES rounds. Because polynomial diversity can be implemented in digital logic, AES engines 40 and 60 provide the SCA-preventive enhancements of this disclosure without the need for additional SCA mitigation hardware. That is, because control logic of AES engines 40 and 60 can select different polynomials for the respective encryption and decryption paths to scramble the overall power trace output by HMD 12 and/or peripheral device 6, the techniques of this disclosure obfuscate the attack surface exposed to SCA analysis hardware using digital logic configurations, thereby causing the SCA analysis hardware to perform SCAs with incorrect pre-processing data. Because the techniques of this disclosure can be implemented in digital logic, the SCA resistant effects of the techniques are extended to HMD 12 and/or peripheral device 6 without adding SCA-mitigation hardware, thereby maintaining the low-profile form factors of these devices.

FIG. 1B is an illustration depicting another example multi-device artificial reality system 20 that includes components configured to implement the SCA-prevention techniques of this disclosure. Similar to multi-device artificial reality system 10 of FIG. 1A, AES engine 40 of HMD SoC 2 included in HMD 12 and AES engine 60 of peripheral SoC 4 included in peripheral device 6 of FIG. 1B may multiplex polynomial-diverse rounds of AES operations to scramble the attack surface potentially exposed by HMD 12 and peripheral device 6 to SCA hardware. AES engines 40 and 60 of HMD SoC 2 and peripheral SoC 4 improve data security by obfuscating the power trace signatures output by HMD 12A and peripheral device 6 according to the mixed sequence (i.e. randomly multiplexed sequence) of polynomial-diverse AES operations of this disclosure. AES engines 40 and 60 intermingle the operation of polynomial-diverse encryption and decryption rounds using the integrated hardware architecture of this disclosure while maintaining AES compliance for both encryption and decryption, and maintaining secure inter-SoC communication between HMD SoC 2 and peripheral SoC 4.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g. wirelessly coupled or tethered to) a portable device that implements generally corresponding features to those described with respect to peripheral device 6.

Figure 2A:
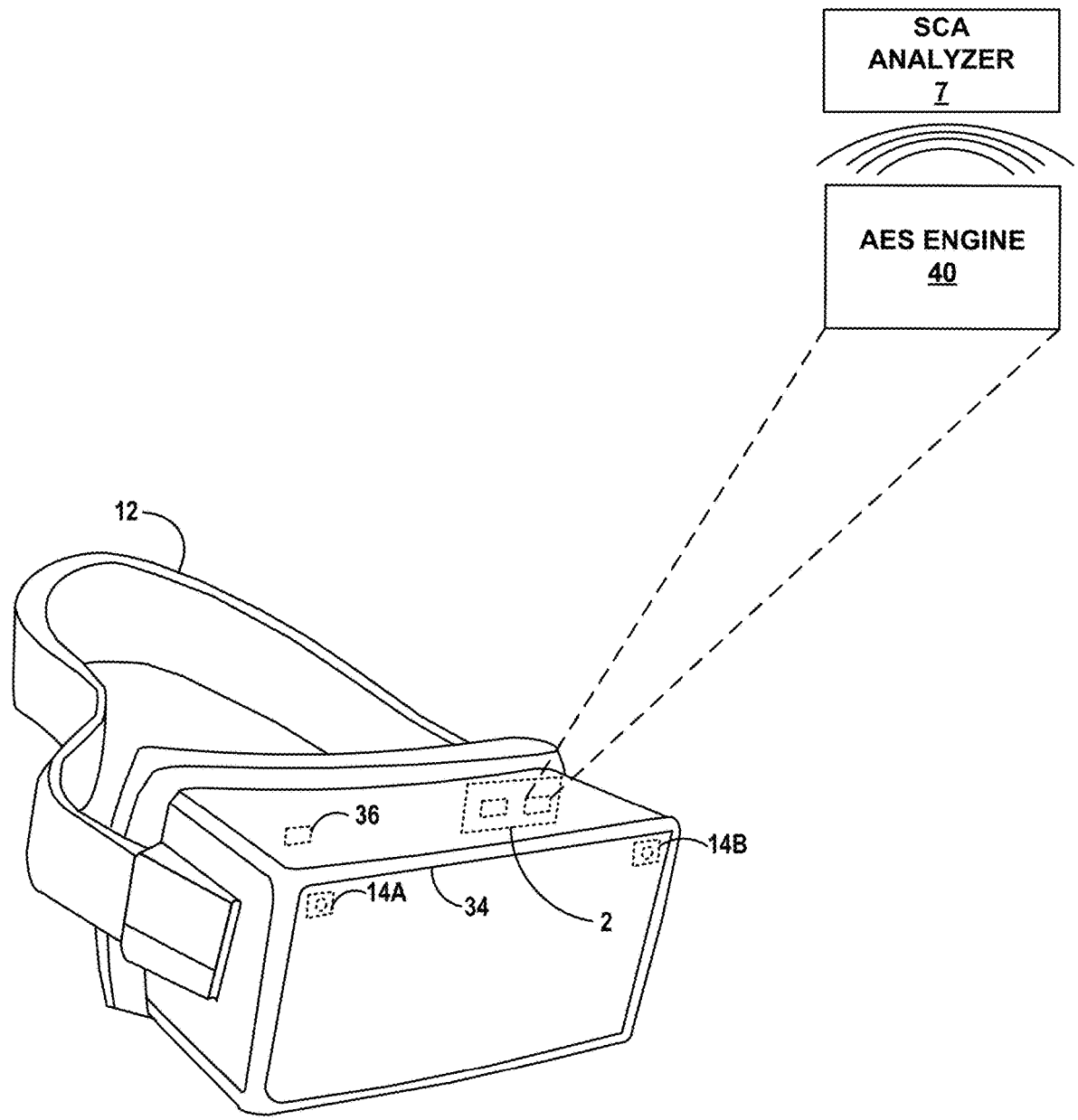
FIG. 2A is an illustration depicting an example HMD configured to encrypt input data before further processing/transmission, and to decrypt and render encrypted artificial reality content in an SCA-resistant manner in accordance with the techniques of the disclosure.

FIG. 2A is an illustration depicting an example HMD configured to encrypt input data before further processing/transmission, and to decrypt and render encrypted artificial reality content in an SCA-resistant manner in accordance with the techniques of the disclosure. HMD 12 of FIG. 2A may be an example of any of HMDs 12 of FIGS. 1A and 1B. In some examples, HMD 12 may be part of an artificial reality system that incorporates other devices and network intermediaries, such as in the examples of multi-device artificial reality systems 10 and 20 illustrated in FIGS. 1A and 1B. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to the wearer (e.g., user 8). In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

Figure 2B:
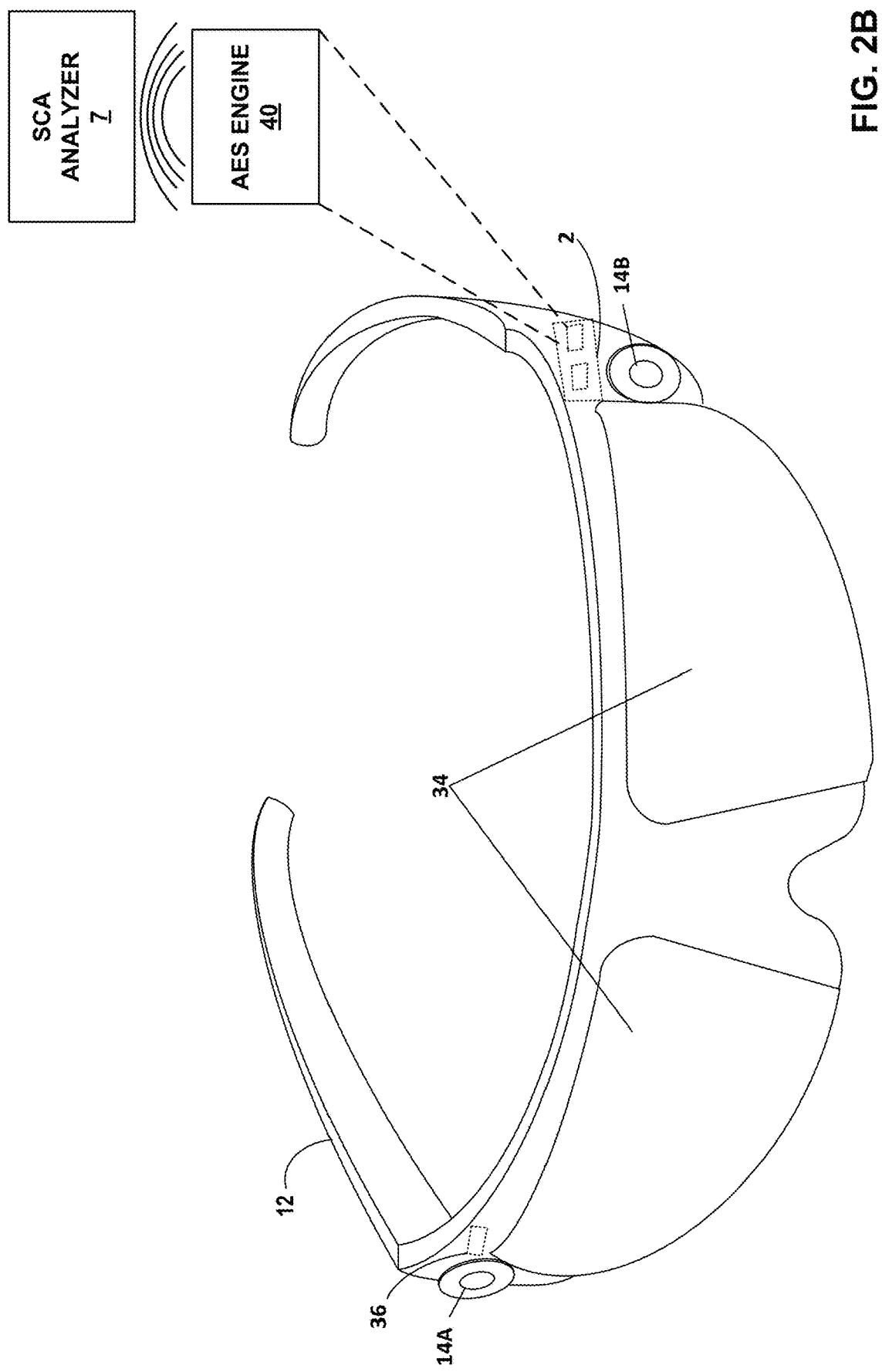
FIG. 2B is an illustration depicting another example of an HMD configured to encrypt input data, and to decrypt and render encrypted artificial reality content in an SCA-resistant manner in accordance with the techniques of the disclosure.

FIG. 2B is an illustration depicting another example of HMD 12 configured to encrypt input data, and to decrypt and render encrypted artificial reality content in an SCA-resistant manner in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the wearer's ears. Elements of FIG. 2B that share reference numerals with elements of FIG. 2A perform corresponding functionalities, and are not described separately with respect to FIG. 2B for the sake of brevity. In the example of FIG. 2B, electronic display 34 may be split into multiple segments, such as into two segments, with each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities (e.g. with respect to peripheral vision and/or central vision, nearfield vision and/or distance vision, etc.), eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data.

Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

HMD SoC 2 of HMD 12 includes AES engine 40, as described above with respect to FIGS. 1A & 1B. As also described above with respect to FIGS. 1A & 1B, AES engine 40 of HMD SoC 2 is configured to randomly switch between executing round(s) of multi-round encryption with a first polynomial and executing round(s) of multi-round decryption with a second polynomial (that is different from the first polynomial) in accordance with aspects of this disclosure. By multiplexing polynomial-diverse AES rounds against each other, AES engine 40 causes HMD 12 to exhibit a randomized power trace signature that effectively decorrelates the power trace from the respective data-key pairs under encryption and decryption. In this way, AES engine 40 generates power profile divergence between the encryption rounds and decryption rounds of the mixed sequence of AES rounds in digital logic, while providing the SCA-preventive benefits of the power profile divergence to both the encryption and decryption operation sets. As such, the configurations of this disclosure improve data security without requiring additional hardware overhead to provide the data security improvement.

FIGS. 2A & 2B also illustrate SCA analyzer 7. SCA analyzer 7 represents an SCA board (e.g., an FPGA-based board or ASIC-based board), a so-called "skimmer," or any other device configured to snoop on the performance metrics of HMD 12. Hackers may use SCA analyzer 7 to implement various types of SCAs, such as a correlation power attack (CPA) or a direct memory access (DMA) attack. To perform a CPA, SCA analyzer 7 provides an input data set to HMD 12. A common example of a CPA involves providing one million test vectors that undergo encryption or decryption with a constant secret key, such as would be performed by an encryption engine that performs encryption operations to encrypt input data to form cipher text, or a decryption engine that performs decryption operations to decrypt cipher text. Various examples are described with respect to AES-compliant encryption and decryption, but it will be appreciated that the SCA-thwarting techniques of this disclosure are also applicable to encryption and decryption operations that conform to other standards or are not compliant to any present standard.

SCA analyzer 7 collects power traces of the AES-compliant system, and analyzes the current traces against a hypothesis that predicts the outcome for a given guess of the key. SCA analyzer 7 guesses the secret key (encryption key or decryption key, as the case may be) one byte at a time, thereby providing 256 possibilities for every byte. SCA analyzer 7 computes statistical correlation coefficients between the measured power traces and each hypothesis across all 256 candidate key bytes. SCA analyzer 7 selects the pairing that produces the highest correlation metric as the secret key guess. An important pre-processing step required for SCA analyzer 7 to compute the correlation metrics is to first align the power traces. By first aligning the power traces, SCA analyzer 7 ensures that the value of the power signature gleaned from different traces each correspond to a unique switching event in the AES-compliant SoC (or SoC configured in another, non-AES-compliant way, as the case may be).

SCA analyzer 7 forms the power trace correlations by relying on particular chronological sequences based on reverse engineering the AES-specified procedures to arrive at the cipher text-encryption key pair or the decryption key-decrypted output pair. According to configurations of this disclosure, AES engine 40 exploits the reliance of SCA analyzer 7 on the pre-processing step of aligning the power traces in order to generate the individual hypotheses corresponding to the unique power traces. AES engine 40 implements the SCA-thwarting techniques of this disclosure by disrupting the alignment operations that SCA analyzer 7 performs as a pre-processing step (or set of pre-processing steps) in the above-described CPA.

AES engine 40 implements the techniques described in this disclosure to obfuscate the overall power trace set collected by SCA analyzer 7, thereby disrupting the correlation between the power trace set and the target result of the SCAs performed. AES engine 40 is implemented in an integrated hardware infrastructure configured to execute a consolidated datapath incorporating both an encryption operation set and a decryption set, according to aspects of this disclosure. Control logic of AES engine 40 executes the encryption operations using a first underlying polynomial and executes the decryption operations using a second polynomial that is different from the first polynomial with which the encryption operations are executed.

In some examples, the control logic of AES engine 40 may update the underlying polynomial with which one or both of the encryption operation set and/or the decryption operation set is executed, while maintaining polynomial diversity between the two operation sets while being executed in a consolidated datapath. The control logic of AES engine 40 may select the polynomial pair from an overall pool of approximately 2,880 possible polynomials, thereby providing polynomial diversity between encryption and decryption operation sets executed in the consolidated datapath throughout a potentially large number of polynomial updates.

In accordance with the techniques of this disclosure, AES engine 40 multiplexes the encryption and decryption operations on a round-by-round basis, thereby generating a mixed sequence of encryption rounds and decryption rounds. Because one set of rounds interspersed throughout the mixed sequence operates using the first polynomial and the other set of rounds interspersed throughout the mixed sequence operates using the first polynomial different from the first polynomial, the mixed sequence of rounds switches between two varying power profiles a number of times throughout its execution. Control logic of AES engine 40 may implement sequence control of the encryption and decryption rounds in the mixed sequence, in accordance with aspects of this disclosure, as well. As examples, the control logic may provide random, pseudo-random, deterministic, or otherwise varying sequences of selection inputs to the multiplexer logic of AES engine 40 to intersperse the mixed sequence with both encryption rounds and decryption rounds. In some examples, the control logic may vary the selection input sequence in a non-static or dynamic way to increase the unpredictability of the power profile toggling over the mixed sequence of encryption and decryption rounds of the combined datapath executed by AES engine 40.

The erratic switching between two disparate power profiles throughout the mixed sequence of AES rounds causes HMD 12 to exhibit a garbled overall power trace signature. Additionally, in cases in which the control logic of AES engine 40 updates the polynomial pair at one or more time intervals, the polynomial pair-change inhibits the ability of SCA analyzer 7 to EXOR the two disparate power profiles of the power trace signatures to surreptitiously obtain one or both of the data-key pairs processed using the encryption operation set and the decryption operation set. In this way, AES engine 40 implements the techniques of this disclosure to provide SCA protection to both the encryption and decryption operation sets, while maintaining data precision (e.g., in the form of AES compliance) with respect to both the encrypted and decrypted output data. In this way, AES engine 40 improves data security with respect to HMD 12 without requiring additional logic overhead to furnish the data security improvements of this disclosure.

FIG. 2C is an illustration depicting an example of a peripheral device configured to encrypt input data, and to decrypt and render encrypted artificial reality content in an SCA-resistant manner in accordance with the techniques of the disclosure. Peripheral SoC 4 of peripheral device 6 performs one or more of the SCA-prevention techniques of this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. In the example of FIG. 2C, image capture devices 14 may capture image data representative of various objects, including peripheral device 6 and/or of the hand(s) of user 8 in the physical environment that are within the FoV of image capture devices 14, which may generally correspond to the viewing perspective of HMD 12.

In the example of FIG. 2C, peripheral SoC 6 of peripheral device 6 includes AES engine 60 shown in FIGS. 1A & 1B. AES engine 60 represents an integrated silicon hardware unit configured to executing both encryption and decryption operations. In some examples, peripheral device 6 may receive encrypted data (e.g., streaming video data, etc.) over network 18, and may invoke decryption engine 63 to decrypt the encrypted data to be used in the generation and rendering of artificial reality content 22 for display on electronic display 34. As described above, peripheral SoC 4 and HMD SoC 2 generally communicate secure data in the form of crypto packet flows.

In some examples, peripheral device 6 may receive encrypted data from HMD 12 (e.g., encrypted facial images and/or retina scans of user 8, other authentication information, etc.), and may invoke AES engine 60 to decrypt the received cipher text for user authentication purposes. Peripheral device 6 may invoke AES engine 60 to encrypt data for various purposes, such as for encryption prior to transmission over network 18, prior to transmission to HMD 12, or for other purposes, as described above with respect to FIGS. 1A-2B.

Surface 38 of peripheral device 6 represents an input component or a combined input/output component of peripheral device 6. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 6 to receive touch input or gesture input without direct contact with surface 38. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

Peripheral device 6 can communicate data to and receive data from HMD 12 (e.g., egress and ingress crypto packet flows) using wireless communications links (e.g., Wi-Fi', near-field communication of short-range wireless communication such as Bluetooth®, etc.), or using wired communication links, or combinations thereof, or using other types of communication links. In the example of FIG. 2C, peripheral device 6 is also communicatively coupled to network 18, thereby enabling peripheral device 6 to upload cipher text generated by AES engine 60 to securely communicate data to remote devices over network 18.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Further details of peripheral device 6 are described in U.S. patent application Ser. No. 16/506,618 (filed on 9 Jul. 2019), the entire content of which is incorporated herein by reference.

Peripheral SoC 4 supports various components, including AES engine 60 and other modules, elements, or operations described herein. In examples in which AES engine 60 is formed as an integrated circuit (IC), AES engine 60 represents an "encryption IC" as well as a "decryption IC." Inter-SoC communications between HMD SoC 2 and peripheral SoC 4 may be in the form of so-called "crypto packets" that include encrypted payloads and plain text headers. In these examples, HMD 12 may invoke AES engine 40 to encrypt the payloads before sending crypto packets to peripheral device 6, and may invoke AES engine 40 to decrypt encrypted payloads obtained from decapsulating crypto packets received from peripheral device 6. Correspondingly, peripheral device 6 may invoke AES engine 60 to encrypt the payloads before sending crypto packets to HMD 12, and may invoke AES engine 60 to decrypt encrypted payloads obtained from decapsulating crypto packets received from HMD 12.

In the example of FIG. 2C, SCA analyzer 7 attempts to perform a CPA against peripheral device 6. Again, SCA analyzer 7 performs CPAs by forming power trace correlations that rely on particular chronological sequences based on reverse engineering the AES-specified procedures to arrive at the cipher text-encryption key pair or the decryption key-decrypted output pair. According to configurations of this disclosure, AES engine 60 exploits the reliance of SCA analyzer 7 on the pre-processing step of aligning the power traces in order to generate the individual hypotheses corresponding to the unique power traces. AES engine 60 implements the SCA-thwarting techniques of this disclosure by disrupting the alignment operations that SCA analyzer 7 performs as a pre-processing step (or set of pre-processing steps) in the above-described CPA.

AES engine 60 implements the techniques described in this disclosure to obfuscate the overall power trace set collected by SCA analyzer 7, thereby disrupting the correlation between the power trace set and the target result of the SCAs performed. AES engine 60 is implemented in an integrated hardware infrastructure configured to execute both encryption datapath and decryption, according to aspects of this disclosure. Control logic of AES engine 60 executes the encryption operations using a first underlying polynomial and executes the decryption operations using a second polynomial that is different from the first polynomial with which the encryption operations are executed.

In some examples, the control logic of AES engine 60 may update the underlying polynomial with which one or both of the encryption operation set and/or the decryption operation set is executed, while maintaining polynomial diversity between the two operation sets. The control logic of AES engine 60 may select the polynomial pair from an overall pool of approximately 2,880 possible polynomials, thereby providing polynomial diversity within the consolidated datapath throughout a potentially large number of polynomial updates.

In accordance with the techniques of this disclosure, AES engine 60 multiplexes the encryption operation set and the decryption operation set on a round-by-round basis, thereby generating a mixed sequence of encryption rounds and decryption rounds. Because one set of rounds interspersed throughout the mixed sequence operates using the first polynomial and the other set of rounds interspersed throughout the mixed sequence operates using the second polynomial different from the first polynomial, the mixed sequence of rounds switches between two varying power profiles a number of times throughout its execution. In various examples, the control logic of AES engine 60 may provide random, pseudo-random, deterministic, or otherwise variant sequences of selection inputs to the multiplexer logic of AES engine 60 to intersperse the mixed sequence with both encryption rounds and decryption rounds. In some examples, the control logic may vary the selection input sequence in a non-static or dynamic way to increase the unpredictability of the power profile toggling over the mixed sequence of encryption and decryption rounds of the combined datapath executed by AES engine 60.

The erratic switching between two disparate power profiles throughout the mixed sequence of AES rounds causes peripheral device 6 to exhibit a garbled overall power trace signature. Additionally, in cases in which the control logic of AES engine 60 updates the polynomial pair at one or more time intervals, the polynomial pair-change inhibits the ability of SCA analyzer 7 to EXOR the two disparate power profiles of the power trace signatures to surreptitiously obtain one or both of the data-key pairs processed via the encryption operation set and the decryption operation set of the combined datapath. In this way, AES engine 60 implements the techniques of this disclosure to provide SCA protection to both the encryption and decryption data-key pairs, while maintaining data precision (e.g., in the form of AES compliance) with respect to the data output by both the encryption and decryption operation sets. In this way, AES engine 60 improves data security with respect to peripheral device 6 without requiring additional logic overhead to furnish the data security improvements of this disclosure.

Figure 3:
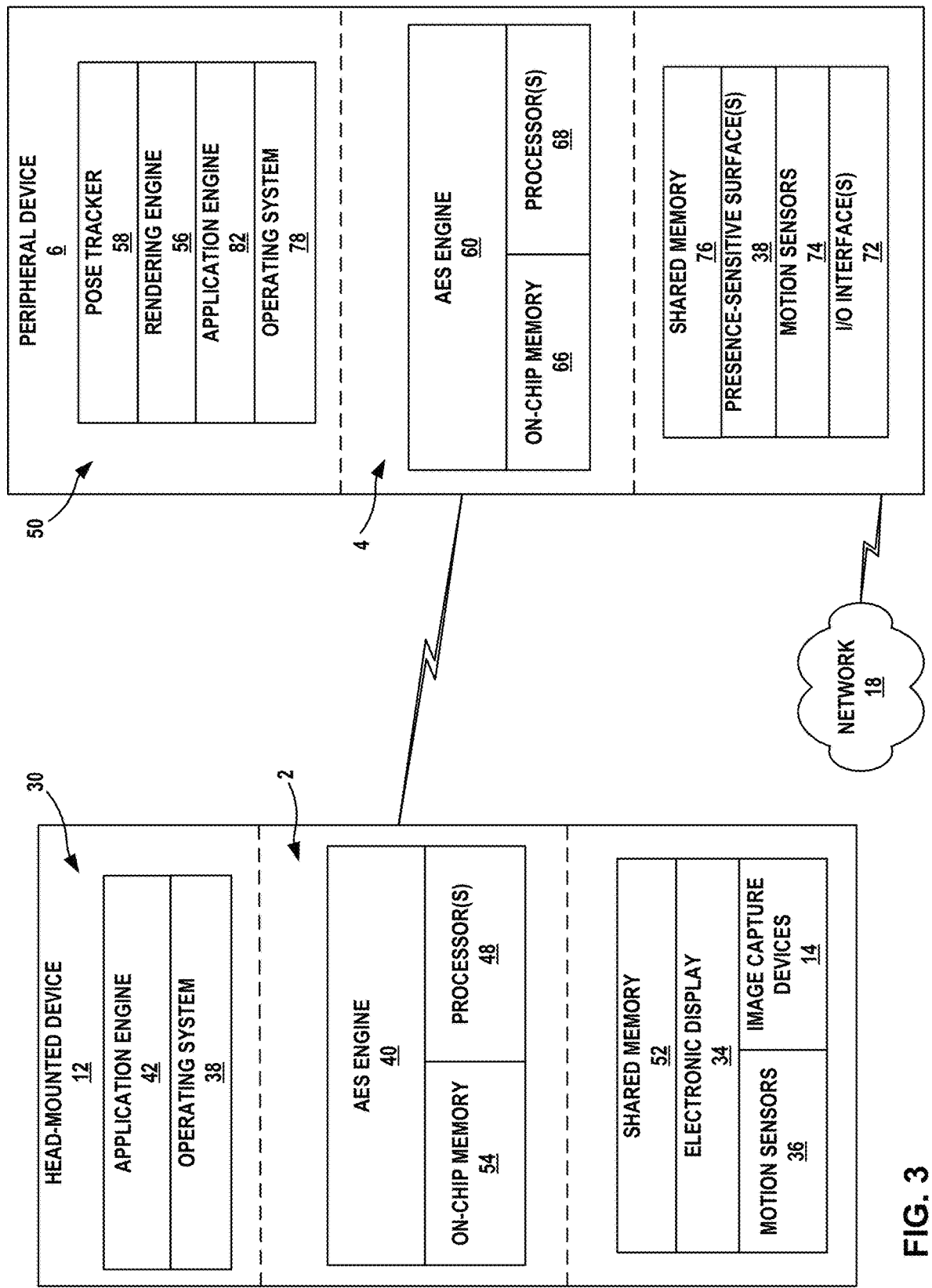
FIG. 3 is a block diagram showing example implementations of an HMD and a peripheral device of this disclosure.

FIG. 3 is a block diagram showing example implementations of HMD 12 and peripheral device 6. In this example, HMD SoC 2 of HMD 12 includes one or more processors 48 and memory 52, in addition to AES engine 40. While HMD SoC 2 is illustrated as incorporating AES engine 40, although it will be appreciated that HMD SoC 2 may, in other examples, incorporate components configured to implement encryption/decryption operations in accordance with standards other than the AES or in non-standard-compliant ways, in other examples within the scope of this disclosure.

Shared memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 36, and/or image capture devices 14. Processor(s) 48 are included in HMD SoC 2, which also includes on-chip memory 56. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2. Processor(s) 48 and on-chip memory 54 may combine to implement scheduler 3, although scheduler 3 is illustrated as a standalone component of HMD SoC 2 purely for the purposes of ease of illustration and discussion.

HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes AES engine 60, on-chip memory 66, and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4. While peripheral SoC 4 is shown in FIG. 3 as incorporating AES engine 60, it will be appreciated that peripheral SoC 4 may include components configured to implement encryption/decryption operations in accordance with standards other than the AES or in non-standard-compliant ways, in other examples within the scope of this disclosure.

Shared memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50. Apart from operating system 78, software components 50 include an application engine 82, a rendering engine 56, and a pose tracker 58.

In some examples, software components 50 may not include rendering engine 56, and HMD 12 may perform the rendering functionalities without co-processing with peripheral device 6.

In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 12.

Application engine 82 and rendering engine 56 construct artificial reality content 22 for display to user 8 in accordance with current pose information for a frame of reference, typically a viewing perspective of HMD 12, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8. During this process, pose tracker 58 operates on sensed data received from HMD 12, such as movement information and user commands, and, in some examples, data from any external sensors 26 (shown in FIGS. 1A & 1B), to capture 3D information within the real-world environment, such as motion by user 8 and/or feature tracking information with respect to user 8. Based on the sensed data, pose tracker 58 determines a current pose for the frame of reference of HMD 12 and, in accordance with the current pose, constructs artificial reality content 22 for communication, via one or more I/O interfaces 72, to HMD 12 for display to user 8.

While HMD 12 and peripheral device 6 may communicate on a number of levels, FIG. 3 is primarily described with respect to communications at the level represented by HMD SoC 2 and peripheral SoC 4. Processor(s) 48 include a security processor of HMD SoC 2, and processor(s) 68 include a security processor of peripheral SoC 4. Processor(s) 48 and processor(s) 68 invoke AES engines 40 and 60, respectively, to encrypt transmission (Tx) channel data, which represents outgoing data with a destination of the other SoC. The respective traversal path of each crypto packet is described by a "channel ID", which is unique to a {source subsystem, destination subsystem} tuple. The source subsystem identifies a discrete subsystem of the originating SoC, and the destination subsystem identifies a discrete subsystem of the destination SoC.

Processor(s) 48 and processor(s) 68 are configured to select the encryption key to be applied by AES engines 40 and 60 respectively, for a given data segment based on the channel ID of the crypto packet that will be formed using the data segment undergoing encryption. Similarly, processor(s) 48 and processor(s) 68 may select the corresponding decryption keys to be applied by AES engines 40 and 60 respectively to decrypt a decapsulated encrypted payload based on the channel ID of the ingress crypto packet that carried the payload. In this way, processor(s) 48 and processor(s) 68 use multi-key encryption and decryption with keys varying on a channel ID-unique basis.

Each of processors 48 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

AES engines 40 and 60 are configured to protect the data-key pairs under encryption/decryption from surreptitious discovery via CPAs, in accordance with aspects of this disclosure. AES engines 40 and 60 exploit the reliance of SCA hardware (e.g., SCA analyzer 7) on the pre-processing step of aligning power traces gathered from within close range of HMD 12 or peripheral device 6 in order to generate individual hypotheses corresponding to the unique power traces. AES engines 40 and 60 disrupt the alignment operations that SCA analyzer 7 performs as a pre-processing step (or set of pre-processing steps) of a CPA by scrambling the overall attack surface exposed by HMD 12 and peripheral device 6 according to the techniques of this disclosure.

At any given time, each of AES engines 40 and 60 executes its respective decryption operation set using an underlying polynomial that is different from the underlying polynomial with which the respective encryption operation set is executed. In accordance with the techniques of this disclosure, AES engines 40 and 60 multiplex the encryption and decryption operation sets on a round-by-round basis, thereby generating a mixed sequence of encryption rounds and decryption rounds. AES engines 40 and 60 may vary the multiplexing selection inputs in a random, pseudo-random, or deterministic way in generating the mixed sequence of encryption rounds and decryption rounds. In some examples, AES engines 40 and 60 may vary the selection input sequence in a non-static or dynamic way to increase the unpredictability of the power profile toggling over the mixed sequences of encryption and decryption rounds executed in their respective consolidated datapaths.

Because the encryption rounds and decryption rounds have different power profiles (owing to the polynomial diversity between the encryption and decryption operation sets executed within a combined datapath), the overall power trace signatures exhibited by HMD 12 and peripheral device 6 are interspersed with power profile-divergent data. The individual power traces corresponding to the encryption operation set and the decryption operation set are thereby cross-obfuscated. In this way, each of AES engines 40 and 60 provides SCA protection for both encryption and decryption operations executed within the common datapath, while preserving data precision (e.g., in the form of AES compliant encryption and decryption outputs) with respect to the common datapath. In this way, AES engines 40 and 60 improve data security with respect to HMD 12 and peripheral device 6, while maintaining data precision and without increasing the logic overhead requirements to provide the data security improvements of this disclosure.

In instances in which each operation set features ten rounds, these configurations produce mixed sequences of AES rounds such that each respective mixed sequence include ten rounds performed using one polynomial and ten rounds performed using another polynomial. In these examples, AES engines 40 and 60 multiplex the encryption rounds against the decryption rounds in the manner described above, producing an overall power trace signature that is obfuscated by way of power profile-divergent subsets of rounds being interleaved with one another throughout the overall power trace signature.

Figure 4:
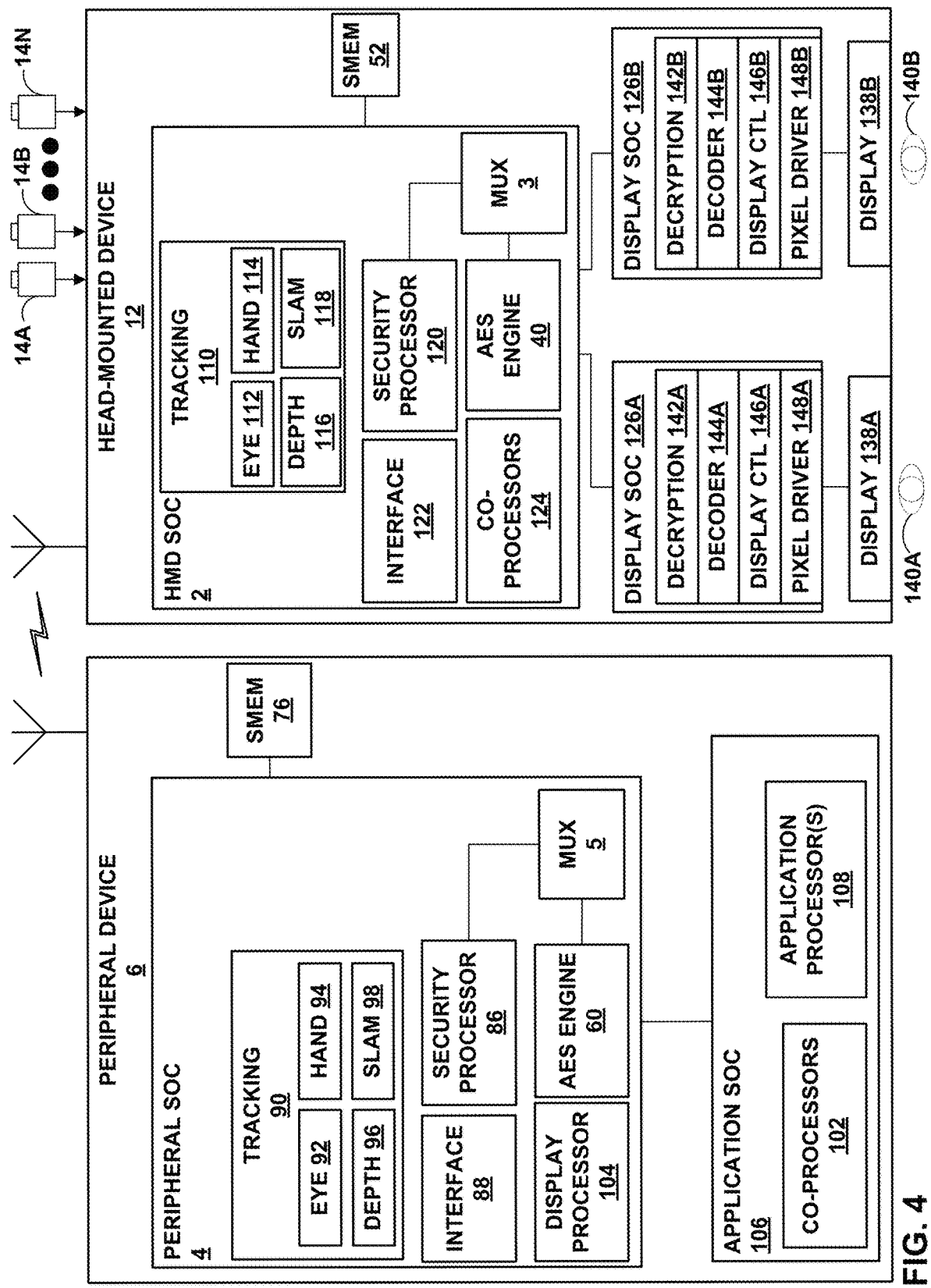
FIG. 4 is a block diagram illustrating a more detailed example implementation of a distributed architecture for multi-device artificial reality systems in which two or more devices are implemented using one or more system on a chip (SoC) integrated circuits within each device.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and AES engine 40. AES engine 40 include encryption engine 44 and decryption engine 46 implemented separately in silicon. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content. As described above with respect to FIGS. 1A-3, AES engine 40 is a functional block configured to encrypt Tx channel data communicated to peripheral device 6 and to decrypt Rx channel data communicated from peripheral device 6 or other system.

Application co-processors 124 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on co-application processors 124. A plurality of artificial reality applications may be concurrently executed on co-application processors 124, in some examples.

Display SoCs 126A and 126B each represent display controllers for outputting artificial reality content on respective displays, e.g., displays 138A, 138B (collectively, "displays 138"). In this example, display SoC 126A may include a display controller for display 138A to output artificial reality content for a left eye 140A of user 8. In the example of FIG. 4, display SoC 126A includes a decryption block 142A, a decoder block 144A, a display controller 146A, and a pixel driver 148A for outputting artificial reality content on display 138A. Similarly, display SoC 126B includes a display controller for display 138B to output artificial reality content for a right eye 140B of user 8. In the example of FIG. 4, display SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and application SOC 106 configured to support an artificial reality application. In this example, peripheral SoC 4 comprises functional blocks including AES engine 40, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

AES engine 60 includes encryption engine 62 and decryption engine 64, implemented separately in silicon. As such, AES engine 60 is a functional block configured to encrypt Tx channel data communicated to HMD 12 and to decrypt Rx channel data communicated from HMD 12. In various examples, AES engine 60 may support symmetric key cryptography to encrypt/decrypt data using a session key (e.g., a secret symmetric key). Display processor 104 includes one or more processors such as a video processing unit, graphics processing unit, encoders and/or decoders, and/or others, for rendering artificial reality content to HMD 12.

Interface 88 includes one or more interfaces for connecting to functional blocks of HMD SoC 4. As one example, interface 88 may include peripheral component interconnect express (PCIe) slots. HMD SoC 4 may connect with application SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the artificial reality environment. Security processor 86 may authenticate application SoC 106 of peripheral device 6.

Application SoC 106 includes application co-processors 102 and application processors 108. In this example, co-application processors 102 include various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by user 8 with respect to peripheral device 6.

In the example of FIG. 4, HMD SoC 2 includes multiplexer (MUX) 3, and peripheral SoC 4 includes MUX 5. MUXes 3 and 5 may be implemented within respective security processors 120 and 86, may form a portion of control logic of respective AES engines 40 and 60, or may be implemented in other ways. According to aspects of this disclosure, MUXes 3 and 5 are configured to multiplex masked rounds against unmasked rounds executed by AES engines 40 and 60, respectively. In this way, MUXes 3 and 5 enable AES engines 40 and 60 to randomly switch between executing encryption rounds and decryption rounds configured with different underlying polynomials, to obfuscate the overall power trace signatures exhibited by HMD 12 and peripheral device 6. The obfuscated power trace signatures scramble the attack surfaces exposed by HMD 12 and peripheral device 6 to SCA analyzer 7. In this way, HMD SoC 2 and peripheral SoC 4 implement the techniques of this disclosure to improve data security while maintaining AES compliance with respect to the encryption and decryption results produced by AES engines 40 and 60.

Figure 5:
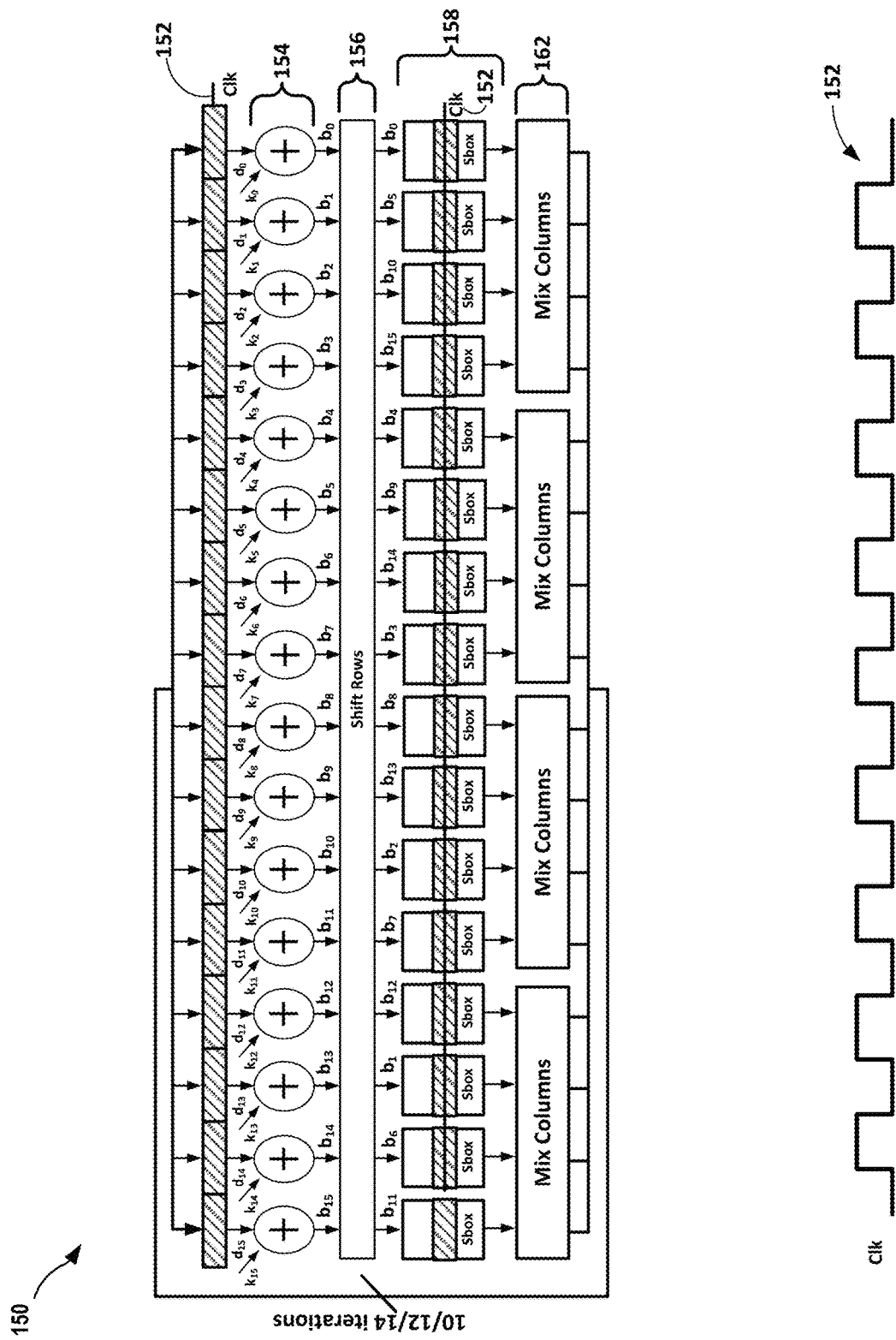
FIG. 5 is a conceptual diagram illustrating an example of an AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant encryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to decryption datapath 150. According to AES round datapath 150, a 16-byte (128-bit) encrypted input is provided, on a per-byte basis, to sixteen adder units as part of "add round key" step 154. In add round key step 154, each byte of the data input is added to a decryption key obtained using Rijndael's key schedule. Each input byte-key pair is shown in FIG. 5 using a "d-k" notation, using subscripts to delineate the different input bytes and the different decryption keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and adds encryption key segments (the encryption key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations described above with respect to AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
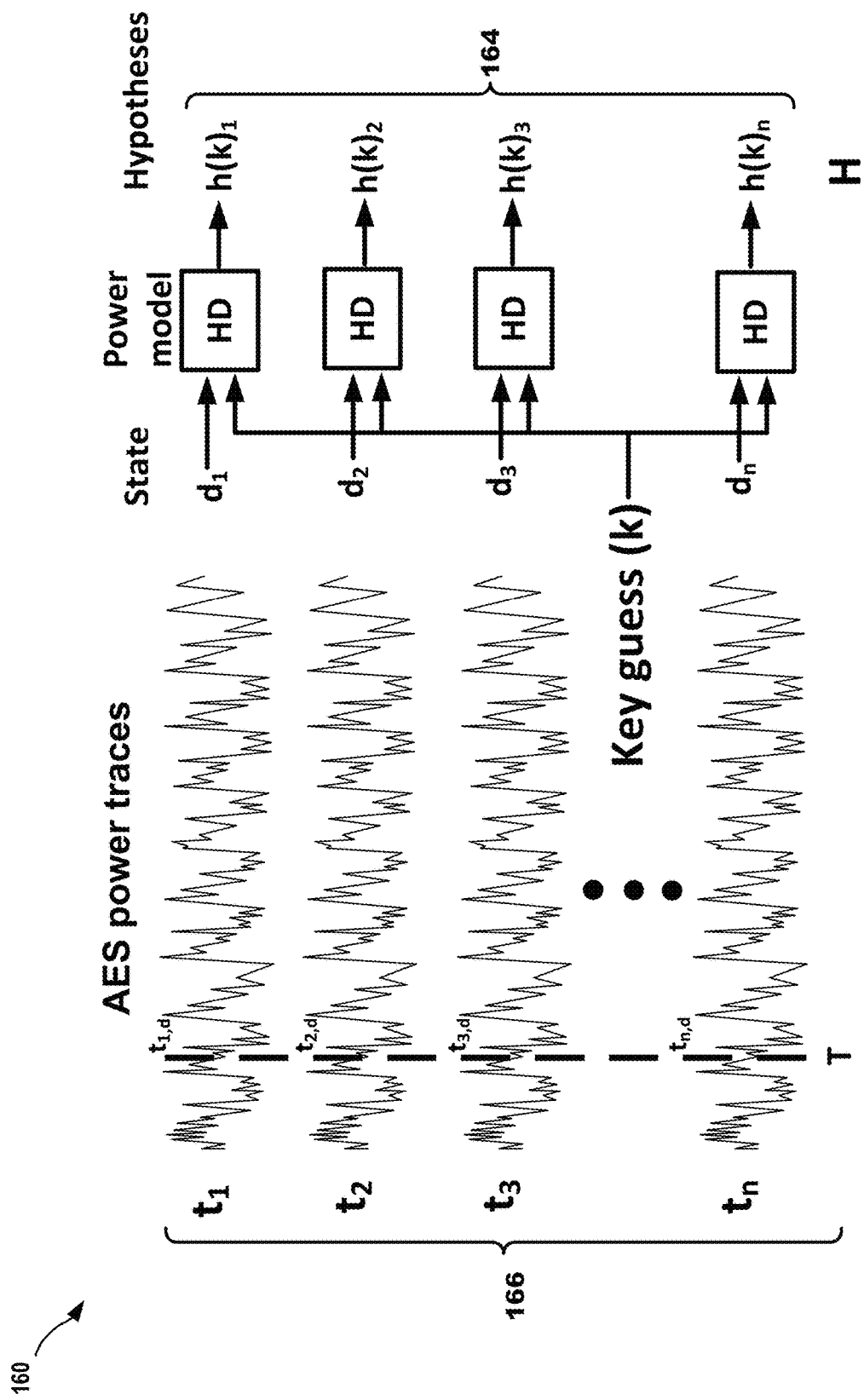
FIG. 6 is a conceptual diagram illustrating aspects of a correlation power attack (CPA).

FIG. 6 is a conceptual diagram illustrating aspects of a correlation power attack (CPA) 160. CPA 160 represents an attack that SCA analyzer 7 may perform. CPA 160 is described as an attack that SCA analyzer 7 performs with respect to a decryption datapath, as an example. SCA analyzer 7 may also perform CPA 160 with respect to encryption datapaths. SCA analyzer 7 may provide a number of sixteen-byte test inputs to AES engine 40 or AES engine 60, and snoop on the power traces exhibited by the device (e.g., HMD 12 or peripheral device 6) that implements the decryption datapath while decrypting the test inputs. For example, SCA analyzer 7 may provide one million test vectors in carrying out CPA 160.

SCA analyzer 7 maintains timestamps for the input times of the various test inputs to AES engine 40 or AES engine 60. The timestamps that SCA analyzer 7 maintains for the full set of test inputs is illustrated in FIG. 6 as ti through $t_n$, where the subscript 'n' denotes the overall number of text inputs provided by SCA analyzer 7 (which is a value of one million in the case of many common SCA models). The underlying datasets of the respective test inputs are illustrated in FIG. 6 as $d_1$ through $d_n$. Using the respective timestamp t and the respective dataset d of a particular test input, SCA analyzer 7 conducts AES power traces 166. Again, because the AES is a publicly available standard, potential hackers can configure SCA analyzer 7 to predict, for known input data, the expected power trace information relatively accurately.

Using datasets $d_1$ through $d_n$, SCA analyzer 7 generates key hypotheses $h(k)_1$ through $h(k)_n$ (collectively, hypotheses 164). That is, SCA analyzer 7 feeds datasets $d_1$ through $d_n$ into a key generation model. In the example of CPA 160, SCA analyzer 7 uses a hardware distance (HD) model to generate hypotheses 164 from datasets $d_1$ through $d_n$. SCA analyzer 7 also skims power traces 166 while each respective dataset d is processed by AES engine 40 or AES engine 60. Because the data of each dataset d and the input time t of each dataset d is known to SCA analyzer 7, SCA analyzer 7 can match or determine likenesses between each AES power trace 166 and each of the 256 (calculated as 2^8 based on the 8-bit input) possible hypotheses 164.

The overall convergence of test inputs is denoted as 'T' in FIG. 6, and the overall convergence of hypotheses 164 is denoted as 'H'. SCA analyzer 7 uses the correlation of T and H (denoted as correlation (T, H)) to predict the decryption key being applied in an AES-defined decryption process. In terms of key prediction, the particular hypothesis 164 that yields the highest correlation (T, H) value tends to be correct key guess in terms of the decryption key being applied in the decryption process. In some notations, the correlation (T, H) value is expressed as a prediction operation R(k), and the correct key guess of the decryption key is the greatest R(k) value obtained from the iterative power trace-to-predicted key comparison operation. That is, the particular hypothesis 164 that maximizes the value of R(k) within the universe of AES power traces 166 tends to be the correct key guess with respect to the AES-decryption process illustrated in FIG. 5 by way of AES round datapath 150.

Figure 7:
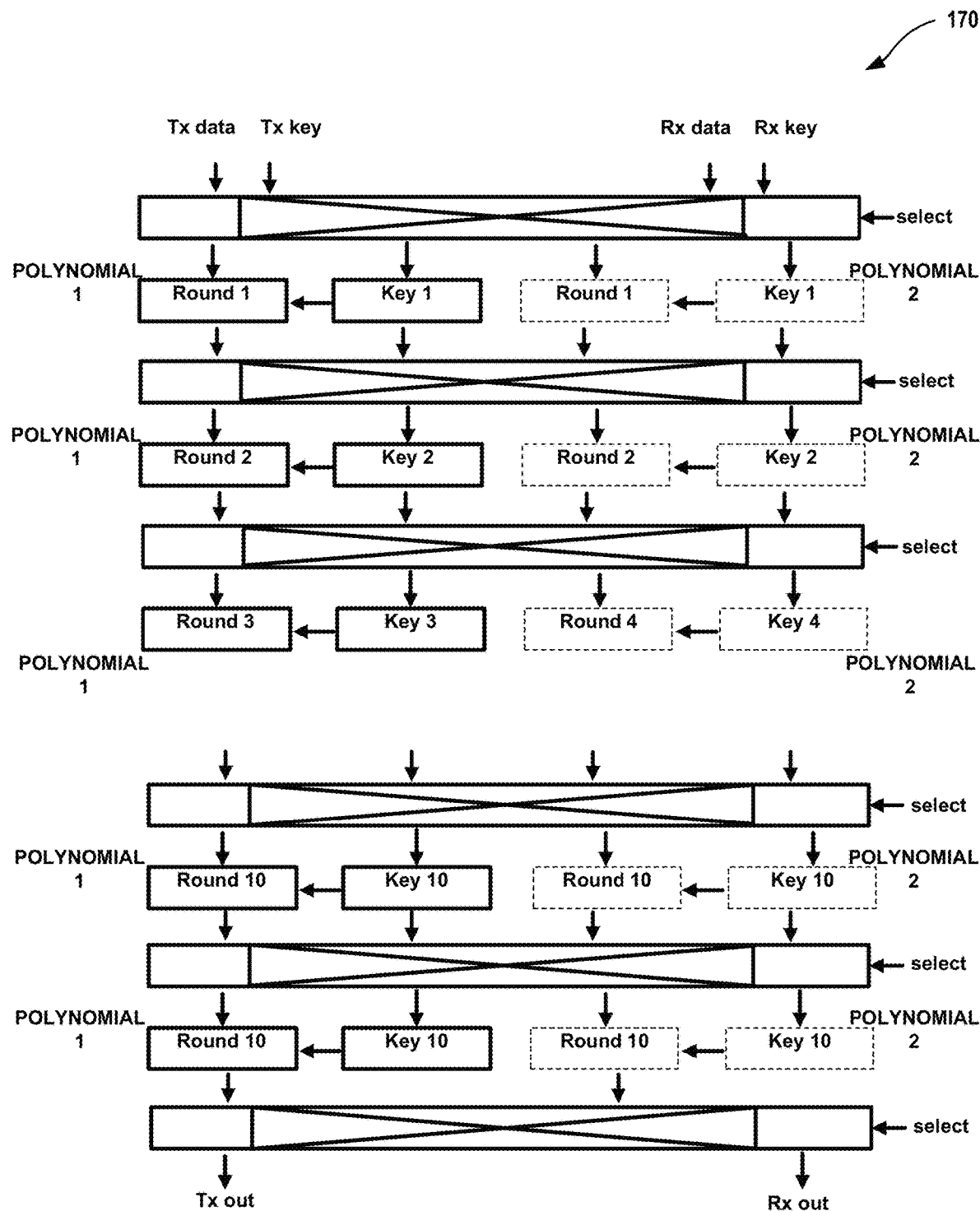
FIG. 7 is a diagram illustrating an integrated encryption-decryption operation set multiplexed on a per-round basis that engines of this disclosure may perform, in accordance with aspects of this disclosure.

FIG. 7 is a diagram illustrating datapath 170 that represents an integrated encryption-decryption operation set multiplexed on a per-round basis that AES engine 40 or AES engine 60 may perform, in accordance with aspects of this disclosure. In the example of FIG. 7, AES engine 40 or AES engine 60 executes the encryption operations using a first polynomial ("polynomial 1" in FIG. 7) to encrypt Tx channel data. AES engine 40 or AES engine 60 executes the decryption operations using a second polynomial ("polynomial 2" in FIG. 7) to decrypt Rx channel data, where the second polynomial is different from the first polynomial. That is, in the example of FIG. 7, polynomial 2 is different from polynomial 1.

MUXes 3 and 5 provide selection inputs (labeled "select") to enable random, pseudo-random, or deterministic selection between a polynomial 2-based decryption round and a polynomial 1-based encryption round. The base encryption key applied to the Tx channel data of FIG. 7 is labeled as a Tx key, and the base decryption key applied to the Rx channel data of FIG. 7 is labeled as an Rx key. Datapath 170 corresponds to ten-round encryption and ten-round decryption as applied to 128-bit input data segments in accordance with the AES. However, it will be appreciated that the random/pseudo-random/deterministic round-switching techniques of this disclosure are also applicable to AES encryption and decryption as applied to input data segments with sizes other than 128 bits, as well.

Figure 8:
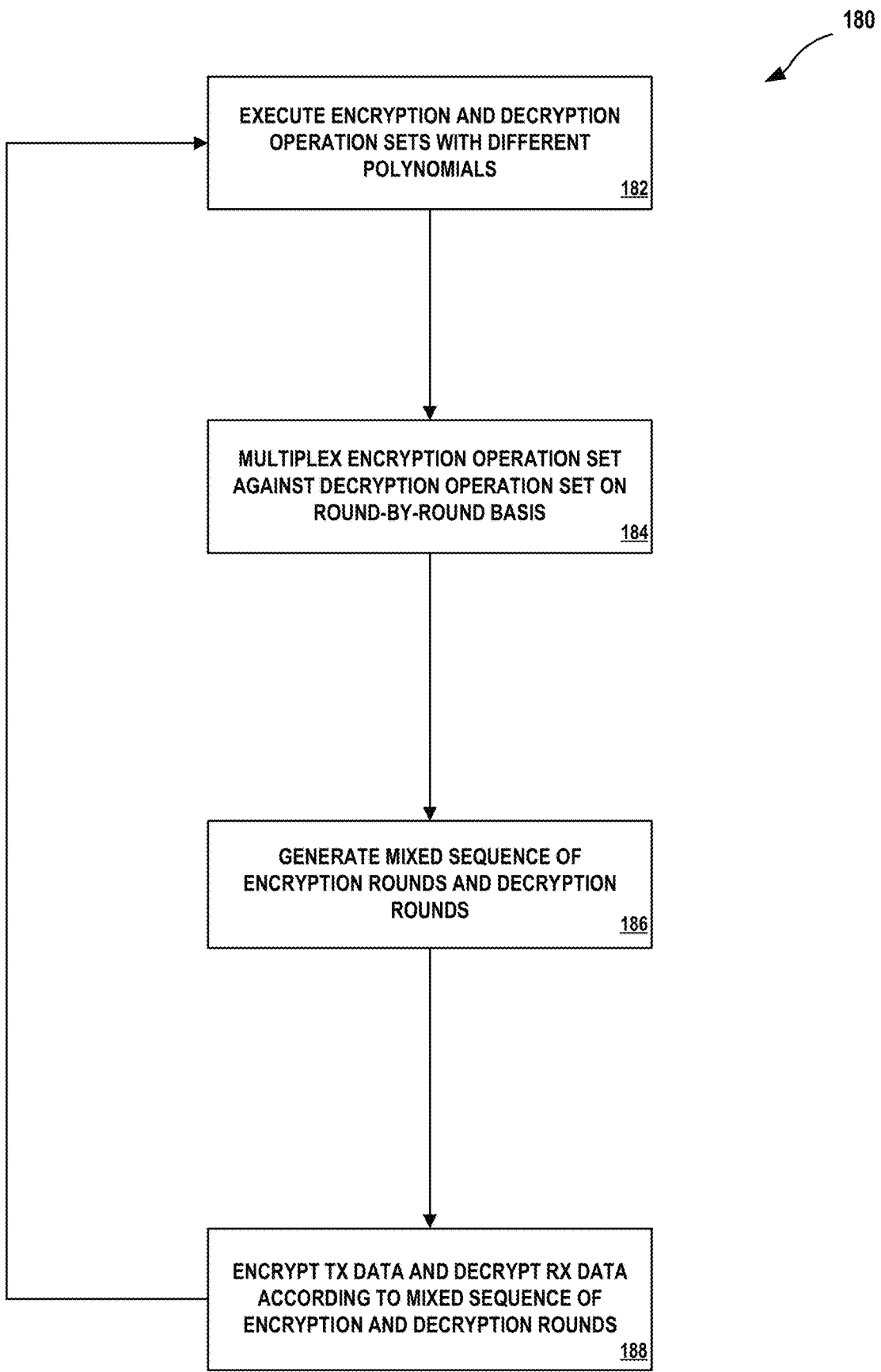
FIG. 8 is a flowchart illustrating an example process that an HMD SoC or a peripheral SoC may perform to prevent SCAs, in accordance with aspects of this disclosure.

FIG. 8 is a flowchart illustrating an example process 180 that HMD SoC 2 or peripheral SoC 4 may perform to prevent SCAs, in accordance with aspects of this disclosure. Process 180 is described as being performed by HMD SoC 2 and components thereof as a non-limiting example, and it will be appreciated that peripheral SoC 4 (and components thereof) may perform process 180 as well. Security processor 120 may execute the encryption operation set and the decryption operation set executed by AES engine 40 with different polynomials (182). The various underlying operations of AES round datapath 150 (addition, inversion, multiplication, etc.) are not purely integer-based operations, but rather, operations that are performed based on an underlying polynomial. Security processor 120 may select the heterogenous polynomial pair from an overall pool of approximately 2,880 possible polynomials. No two polynomials of the pool cause the executing datapaths to consume identical amounts of power in a given round or sequence of rounds.

Security processor 120 invokes MUX 3 to multiplex the encryption operation set implemented by AES engine 40 against the decryption operation set implemented by AES engine 40 on a round-by-round basis (184). For example, security processor 120 may provide a varied sequence of selection inputs to MUX 3 to generate a mixed sequence of encryption rounds and decryption rounds. Security processor 120 may provide the sequence of selection inputs in such a way as to generate a random, pseudo-random, or deterministic ordering with respect to the mixed sequence of encryption rounds and decryption rounds. In some examples, security processor 120 may vary the selection input sequence in a non-static or dynamic way to increase the unpredictability of the power profile toggling over the mixed sequence of encryption and decryption rounds of the combined datapath executed by AES engine 40. Again, AES engine 40 executes the encryption rounds of the encryption operation set with respect to Tx channel data and executes the decryption rounds of the decryption operation set with respect to Rx channel data.

By using MUX 3 to multiplex the encryption operation set against the decryption operation set on a round-by-round basis using a varied series of selection inputs, security processor 120 generates a mixed sequence (e.g., a random, pseudo-random, or deterministic sequence) of encryption rounds and decryption rounds (186). In some examples, security processor 120 may vary the selection inputs such that the mixed sequence varies in a non-static way. Security processor 120 may control AES engine 40 to encrypt the Tx channel data and decrypt the Rx channel data according to the mixed sequence of encryption rounds and decryption rounds (188). AES engine 40 may execute the polynomial-diverse encryption rounds and decryption rounds in a combined datapath, using the hybrid engine infrastructure of AES engine 40. Because of the polynomial heterogeneity between the encryption and decryption operation sets (established at step 182 of process 180), the combined datapath formed from the mixed sequence of encryption and decryption rounds involves toggling between two different polynomials.

This polynomial switching causes AES engine 40 to toggle (potentially numerous times) between two different power profiles through the course of executing the mixed sequence of encryption rounds and decryption rounds. By changing power profiles through the course of the mixed sequence of encryption and decryption rounds of the combined datapath in a random, pseudo-random, or deterministic way, AES engine 40 scrambles the overall attack surface exposed by HMD 12 to SCA analyzer 7. In the example of process 180, upon completing the mixed sequence of encryption and decryption rounds of the combined datapath, security processor 120 may configure AES engine 40 to execute the encryption operation set and the decryption operation set using another heterogenous polynomial pair (thereby returning to step 182).

The new polynomial pair may be entirely different form the previously used polynomial pair, may partially overlap with the previously used polynomial pair, or may overlap fully with the previously used polynomial pair, so long as the new polynomial pair remains heterogenous. In other examples, security processor 120 may update the polynomial pair after a different number of passes of process 180. By updating the polynomial pair at certain time intervals, security processor 120 inhibits the ability of attackers using SCA analyzer 7 to EXOR the two diverse power profiles of the overall power signature output by HMD 12 to surreptitiously obtain one or both of the data-key pairs under encryption and/or decryption.

In some examples, if security processor 120 determines that AES engine 40 only has access to data on one channel (Tx or Rx, but not both), security processor 120 may cause AES engine 40 to hold the data until data becomes available on the presently inactive channel. While described in this disclosure as being performed by security processor 120 as an example, it will be appreciated that, in other examples, other logic of HMD SoC 2 may generate the mixed sequence of encryption rounds and decryption rounds. In some examples, HMD SoC 2 may include scheduler logic configured to generate the mixed sequence of encryption rounds and decryption rounds by providing the varied series of selection inputs to MUX 3. In some examples, HMD SoC 2 may generate the varied selection input sequence with non-static variation or dynamic variations to increase the unpredictability of the power profile toggling over the mixed sequence of encryption and decryption rounds of the combined datapath executed by AES engine 40.

As used herein, the term "polynomial" refers to a combination of a ground-field polynomial and an extension-field polynomial. Cryptographic engines use the ground-field polynomial to split 8-bit data blocks into 4-bit data segments, and uses the extension-field polynomial to process each 4-bit data segment that was formed using the ground-field polynomial. AES engines 40 and 60 may use various combinations of available ground-field polynomials and extension-field polynomials when operating according to different configurations.

Figure 9:
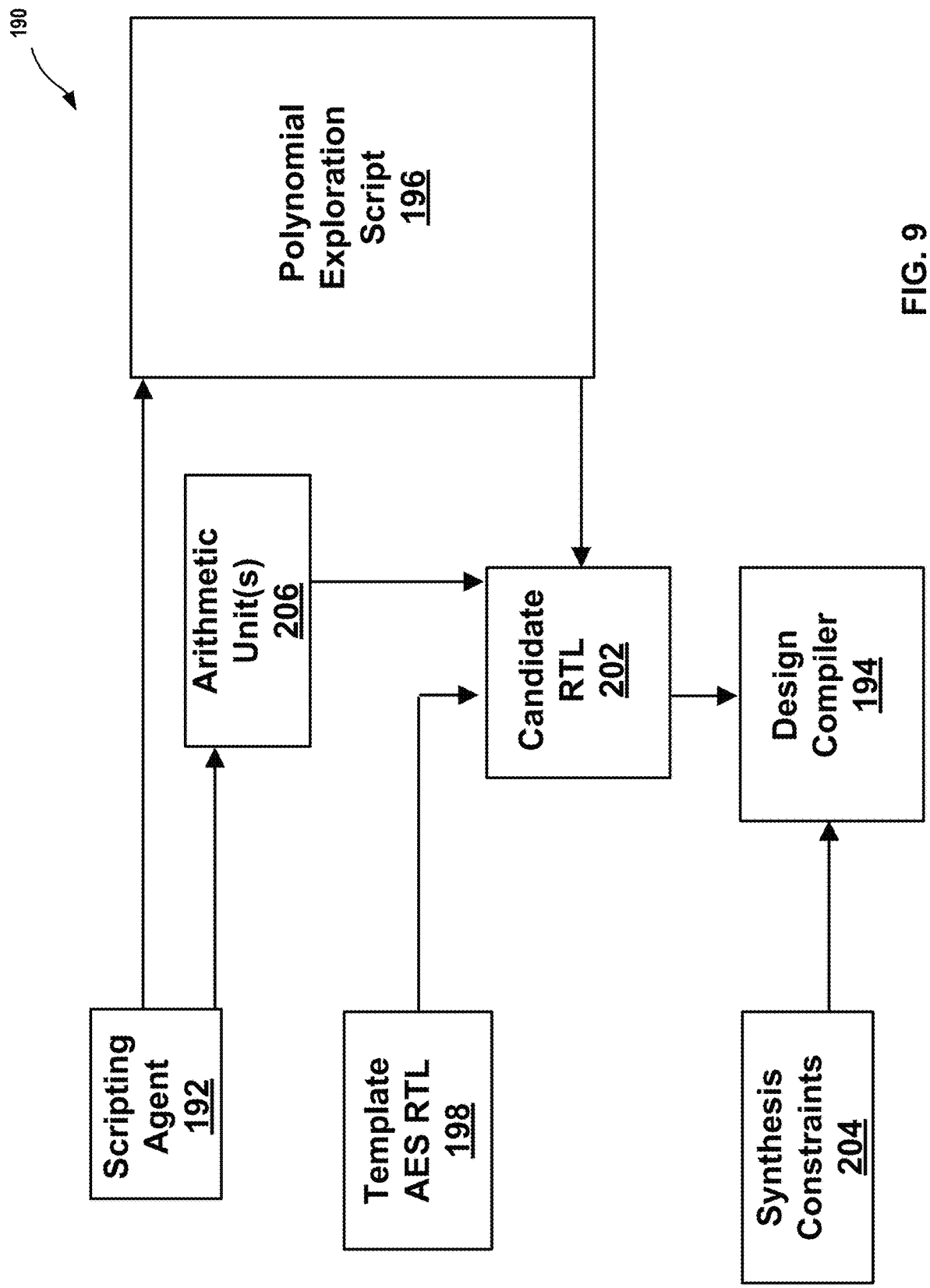
FIG. 9 is a data flow diagram illustrating polynomial exploration according to techniques of this disclosure.

FIG. 9 is a data flow diagram illustrating polynomial exploration according to techniques of this disclosure. Security processor 120 implements polynomial exploration framework 190 of FIG. 9 using scripting agent 192 and design compiler 194. Scripting agent 192 generates script 196 that explores the arithmetic mappings of ground-field polynomials to extension-field polynomials. Scripting agent 192 explores 2,880 possible polynomial mappings by executing script 196. Candidate register transfer level (RTL) unit 202 accepts, as inputs, the results of script 196, as well as data output by template RTL unit 198 and arithmetic unit(s) 206 to generate power profiles of the various polynomial mappings generated by scripting agent via execution of script 196. In turn, design compiler 194 analyzes the various power profiles output by candidate RTL unit 202 under synthesis constraints 204 to select a pair of polynomial mappings to assign to the encryption and decryption operation sets executed by AES engine 40.

In some ASIC-based implementation (which provide less flexibility than some other types of implementations), scripting agent 192 and compiler 194 may execute to perform the analysis operations during a design phase with simulation. In some FPGA-based implementations and/or software-assisted hardware platforms, scripting agent 192 and compiler 194 may execute at runtime on chip to perform the analysis in-line, thereby measuring power and selecting the polynomials with the most diverse power profiles.

Design compiler 194 implements the techniques of this disclosure to select two polynomial mappings that exhibit at least a threshold power profile differential. By selecting polynomial mappings with at least a threshold power profile differential, design compiler 194 enables security processor 120 to configure AES engine 40 to obfuscate the overall power trace signature output by HMD 12, based on the selection input series received from MUX 3. That is, by meeting or exceeding a predetermined power profile differential on each encryption round-to-decryption round toggle (or vice versa), AES engine 40 introduces sufficient power profile instability to the overall power trace signature to foil the power metric alignment steps that SCA analyzer 7 performs as an essential pre-processing step of CPA 160.

Security processor 86 may execute a framework analogous to polynomial exploration framework 190 to enable AES engine 60 to obfuscate the overall power trace signature output by peripheral device 6, but the framework executed by security processor 86 is not described herein separately for the sake of brevity and because of the parallels to polynomial exploration framework 190 as described above with respect to security processor 120.

An example of polynomial exploration script 196 is presented below:

```
parameter ALPHA = 4'd2;
parameter BETA = 4'd1;
parameter GF_2_4_POLY = 4'd3;
//Mapping Matrix
parameter MAP7 = 8'b10101100;
parameter MAP6 = 8'b11011110;
parameter MAP5 = 8'b11010010;
parameter MAP4 = 8'b01111100;
parameter MAP3 = 8'b00100000;
parameter MAP2 = 8'b01001100;
parameter MAP1 = 8'b01110110;
parameter MAP0 = 8'b11100101;
//Inverse Mapping Matrix
parameter INVMAP7 = 8'b11101000;
parameter INVMAP6 = 8'b01100100;
parameter INVMAP5 = 8'b00001000;
parameter INVMAP4 = 8'b00011100;
parameter INVMAP3 = 8'b10100010;
parameter INVMAP2 = 8'b11000010;
parameter INVMAP1 = 8'b10110000;
parameter INVMAP0 = 8'b01000111;
parameter SQ0 = 4'b0101;
parameter SQ1 = 4'b0100;
parameter SQ2 = 4'b1010;
parameter SQ3 = 4'b1000;
//Sbox Matrix
parameter MAMINV7 = 8'b00111000;
parameter MAMINV6 = 8'b00010100;
parameter MAMINV5 = 8'b11010010;
parameter MAMINV4 = 8'b10011001;
parameter MAMINV3 = 8'b11000100;
parameter MAMINV2 = 8'b11010110;
parameter MAMINV1 = 8'b10010101;
parameter MAMINV0 = 8'b10001000;
parameter MC = 8'b 10001111;
//Sbox Matrix Doubler
parameter MAMINVD7 = 8'b01101011;
parameter MAMINVD6 = 8'b10000100;
parameter MAMINVD5 = 8'b01110100;
parameter MAMINVD4 = 8'b11111010;
parameter MAMINVD3 = 8'b10001011;
parameter MAMINVD2 = 8'b00110100;
parameter MAMINVD1 = 8'b10011100;
parameter MAMINVD0 = 8'b00010110;
parameter MCD = 8'b00100011;
//Mapped Round Constants
parameter RCON0 = 8'b00000001;
parameter RCON1 = 8'b01100010;
parameter RCON2 = 8'b11010111;
parameter RCON3 = 8'b11010100;
parameter RCON4 = 8'b01110010;
parameter RCON5 = 8'b10011011;
parameter RCON6 = 8'b01110111;
parameter RCON7 = 8'b11100001;
parameter RCON8 = 8'b11000101;
parameter RCON9 = 8'b01011100;
```

In this way, security processors 86 and 120 implement the techniques of this disclosure to explore the optimal AES arithmetic for a given accelerator architecture using parallel processes (as opposed to word serial processes), with and without inline key expansion, and with a unified encryption/decryption sequence of rounds (as opposed to separate round sequences). Security processors 86 and 120 may expose arithmetic dependencies to optimizer hardware to develop a model that captures all arithmetic dependencies. In this way, security processors 86 and 120 automate the exploration to exhaustively evaluate all possibilities, in accordance with aspects of this disclosure.

Figure 10:
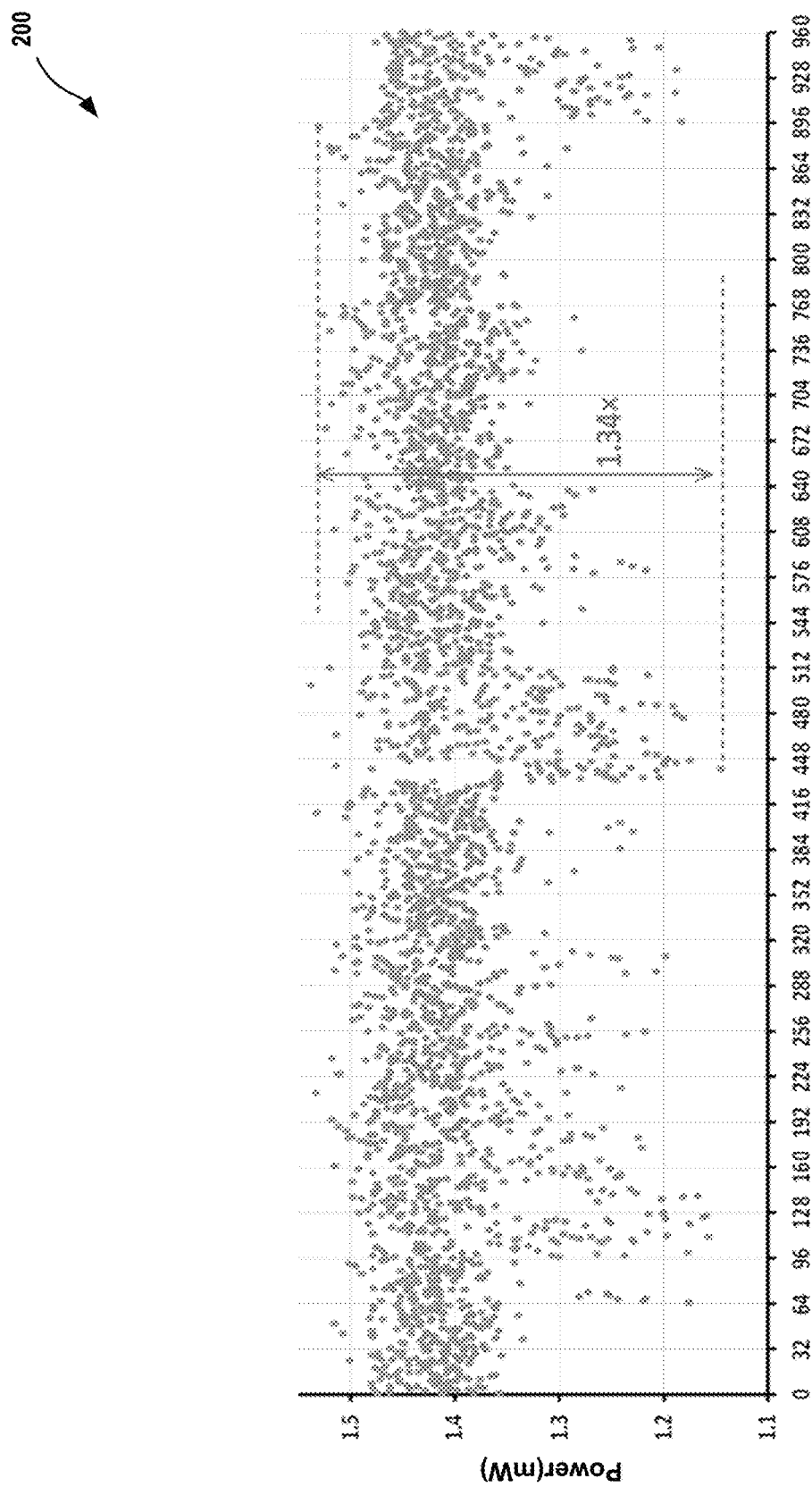
FIG. 10 is a scatterplot illustrating examples of power profile dependence of cryptographic engines on underlying polynomials.

FIG. 10 is a scatterplot illustrating examples of power profile dependence of cryptographic engines on underlying polynomials. Scatterplot 200 plots power consumption (in milliWatts, shown as mW) on the vertical (y) axis and a design parameter index metric associated with the underlying polynomial pair on the horizontal (x) axis. The design parameter runs from index 1 to 960 (for the first polynomial) where each index corresponds to three points for the second polynomial. As shown in scatterplot 200, the pool of polynomials from which design compiler 194 can select offers significant amount of power profile diversity, with the greatest power profile exceeding the lowest power profile by a factor of 1.34 (or 34%).

In this example, scatterplot 200 depicts experimental results associated with a polynomial exploration for an AES encryption engine with a 14 nanometer (nm) logical area, with a 0.75 Volt (V) voltage, a 250 megaHertz (MHz) frequency, and a 6.4 gigabit per second (Gbps) data rate. The extension field polynomial for the exploration shown in scatterplot 200 is given by:

$$(x^2+\alpha x+\beta, \alpha, \beta = [0,1,\ldots 15]) \qquad (1)$$

and the ground field polynomial for the exploration shown in scatterplot 200 is given by"

$$x^4+X+1, x^4+x^3+1, x^4+x^3+x^2+x+1 \qquad (2)$$

Each power profile is also associated with multiple polynomial options, as shown by the multiple plots at each y-axis position. As such, for any given pass of configuration for AES engine 40 or AES engine 60, design compiler 194 may form a power profile-diverse polynomial pair using a number of options. In this way, design compiler 194 may reconfigure AES engine 40 or AES engine 60 a number of times to inhibit the ability of an attacker using SCA analyzer 7 to EXOR the two power traces to obtain one or both of the data-key pair under encryption and/or decryption, while maintaining sufficient power profile diversity within each configuration to scramble the overall power trace signature exhibited by HMD 12 and/or peripheral device 6 at a given time.

Figure 11:
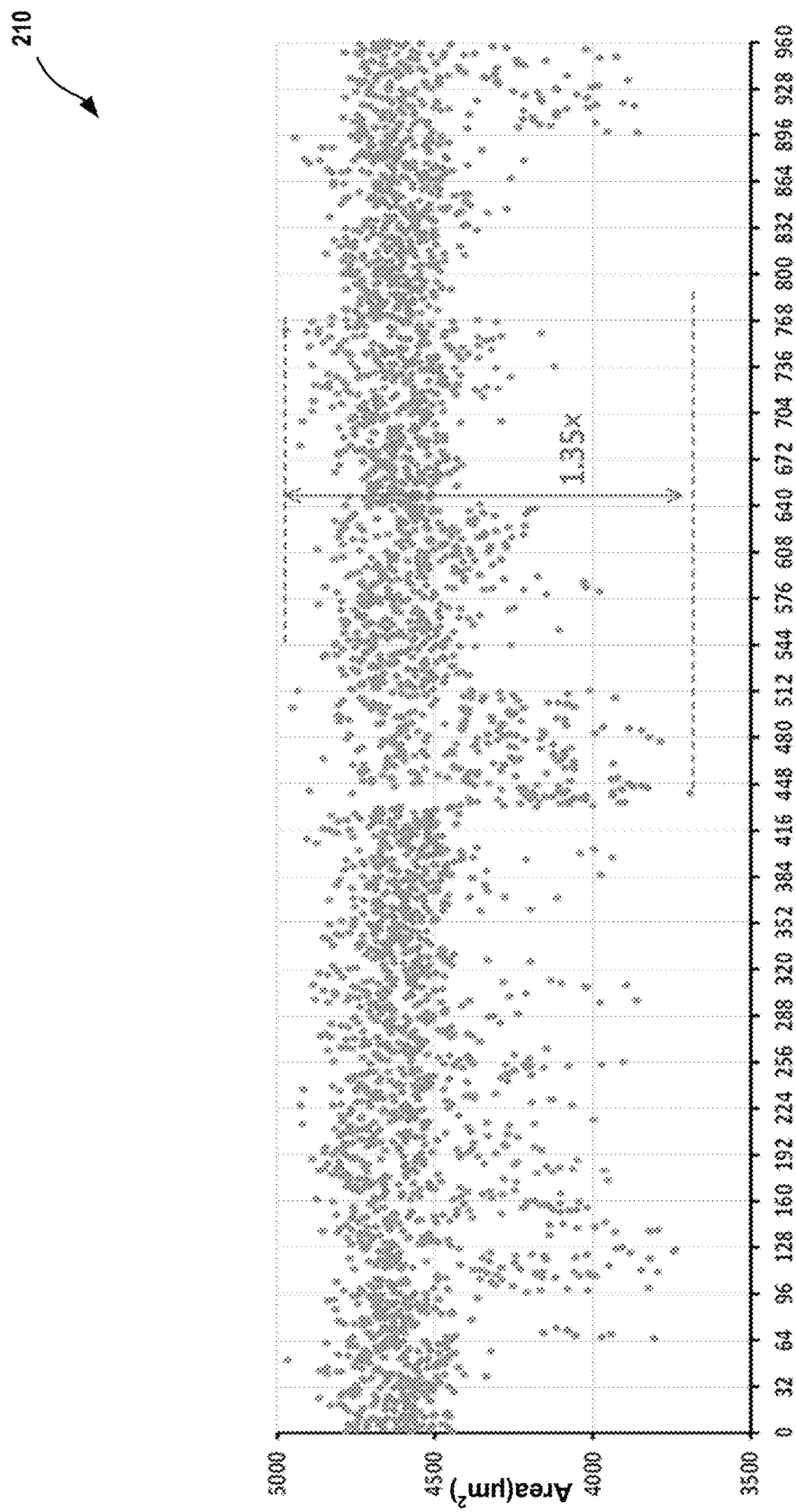
FIG. 11 is a scatterplot illustrating examples of the dependence of the logical area of a cryptographic engine on underlying polynomials.

FIG. 11 is a scatterplot illustrating examples of the dependence of the logical area of a cryptographic engine on underlying polynomials. Scatterplot 210 plots logical area (in micrometers, shown as μm) on the vertical (y) axis and a design parameter index metric associated with the underlying polynomial pair on the horizontal (x) axis. Scatterplot 210 is associated with the same experimental results of polynomial exploration depicted in scatterplot 200 of FIG. 10, i.e. with the same test cryptographic engine and the same ground field and extension field polynomials. Logical area (plotted on the y-axis of scatterplot 210) of a cryptographic engine is directly proportional and tightly correlated to the power profile (shown in FIG. 10) of the cryptographic engine. As shown in scatterplot 210, the pool of polynomials from which design compiler 194 can select offers significant amount of cryptographic engine logical area diversity, with the largest area exceeding the smallest area by a factor of 1.35 (or 35%). In terms of the optimal area, an optimal AES engine would be configured with a ground field polynomial of:

$$x4+x+1 \quad (3)$$

and an extension field polynomial of:

$$x2+x+9 \quad (4)$$

Inverse byte substitution computational stage 158 and mix columns step 162 represent performance-critical computational stages of AES round datapath 150. Correspondingly, an Sbox stage and a mix columns stage of an AES encryption datapath represent performance-critical computational stages of the AES encryption datapath. FIGS. 12A-13B illustrate aspects of the performance enhancements provided by the configurations of this disclosure by way of the example of Sbox-stage (or inverse Sbox-stage) resource usage reductions.

Figure 12B:
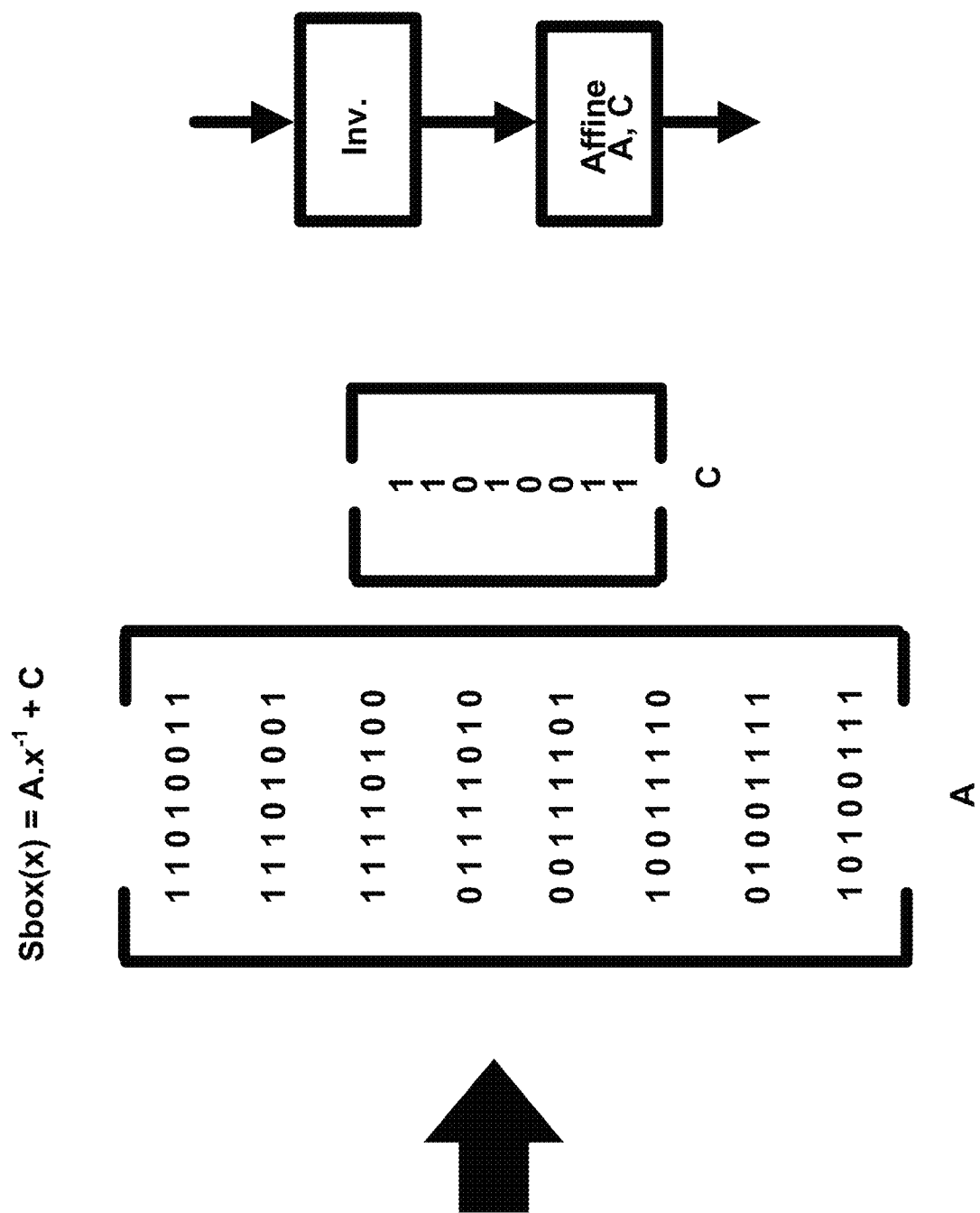

FIGS. 12A-12C illustrate aspects of AES-specified Sbox and inverse Sbox operations, which is LUT-based. FIG. 12A is a table illustrating a 256b by 8b LUT in accordance with AES-specified Sbox and/or AES-specified inverse Sbox operations. FIG. 12B shows matrix multiplication that forms a portion of an Sbox computational stage, as well as an inversion operation with affine conversion that form a portion of an inverse Sbox computational stage, such as inverse byte substitution computational stage 158 of FIG. 5. FIG. 12C illustrates various attributes of the LUT-based Sbox and inverse Sbox stages specified in the AES, such as the field (in this case, a ground field polynomial), the respective matrix multiplication on both the encryption and decryption sides, the number of Sbox units per round (16 in the case of a full round hardware), and the number of Sbox units per key (4 in this case).

According to the LUT-based Sbox implementation of FIGS. 12A-12C, the ground field reduction polynomial is represented by the following equation:

$$GF(2^8) \text{ Reduction Poly}=x^8+x^4+x^3+x+1(1\ 0001\ 1011) \quad (5)$$

Aspects of the matrix multiplication illustrated in FIG. 2B are illustrated by the following equation, which is shown in multiple steps:

$$\text{Multiply } (2*136): 0000\ 0010*1000\ 1000 = \quad (6)$$
$$x*(x^8+x^3) = x^9+x^4 = x(x^8+x^4+x^3+x+1)+(x^9+x^4) =$$
$$x^5+x^4+x^3+x+1 = 0011\ 1011\ (59)$$

Figure 13A:
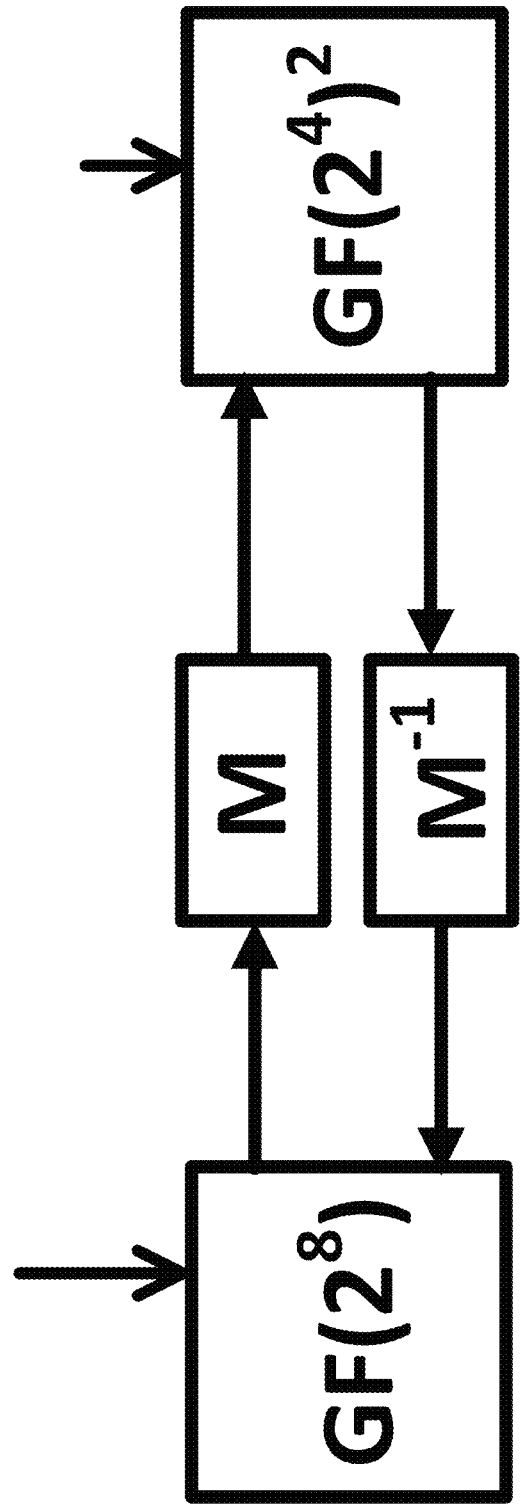
FIGS. 13A & 13B illustrate aspects of a finite-field implementation of byte substitution and inverse byte substitution computational stages in accordance with examples of this disclosure.
Figure 13B:

FIGS. 13A & 13B illustrate aspects of a finite-field implementation of Sbox and inverse Sbox computational stages in accordance with examples of this disclosure. FIG. 13A illustrates matrix multiplication that enables AES engines 40 and 60 to convert the AES-specified 256b ground field polynomial to a design-specific pair of 16b polynomials, and vice versa. Using the matrix multiplication operations illustrated in FIG. 13A, AES engines 40 and 60 may maintain AES compliance while availing of the reduced computational resource expenditure of finite-field isomorphism. FIG. 13B illustrates the multiplication matrices 'M' and 'A' and their respective inverses (for inverse Sbox operation) used, respectively, for ground-field polynomial conversion and for the application of the reduced, design-specific ground field polynomial of the finite-field Sbox of this disclosure. The design-specific ground field polynomial and corresponding extension-field polynomial (for operating on each 16b segment) are shown, respectively, in equations (7) and (8) below:

$$f(x)=x^4+a_3x^3+a_2x^2+a_1x^1+a_0 \quad (7)$$

$$g(x)=x^2+\alpha x+\beta\ \alpha,\ \beta \in GF(2^4) \quad (8)$$

Using the techniques illustrated in FIGS. 13A & 13B, AES engines 40 and 60 may convert operands from $GF(2^8)$ format to $GF(2^4)^2$ format (with 'GF' denoting a ground-field polynomial). AES engines 40 and 60 transform the matrices of the LUT-based Sbox and inverse Sbox operations to be applicable in the reduced format of the finite-field implementations of this disclosure. AES engines 40 and 60 leverage the simplified (4b) arithmetic of the finite-field implementations of this disclosure instead of the 8b arithmetic of LUT-based Sbox and inverse Sbox implementations to provide an overall 20% saving in logical area.

In this way, AES engines 40 and 60 provide energy-efficient encryption and decryption that improve performance for AR, VR, and other computer-mediated reality systems. The arithmetic-architecture co-optimization of the configurations of this disclosure provide significant logical area/energy consumption savings, and the scripting agent-based design space exploration automates an exhaustive search for optimal polynomial selection to provide power profile diversity. HMD SoC 2 and peripheral SoC 4 leverage the finite-field isomorphism described with respect to FIGS. 13A & 13B for power signature obfuscation to improve resistance to SCAs, and the configurations of this disclosure are sufficiently polymorphic to be optimized for cryptographic engines that conform to other standards such as SM4, *Camellia*, Aria, etc., or off-standard cryptographic engines with relatively minor modifications.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
    an encryption/decryption engine configured to:
        encrypt transmission (Tx) channel data using an encryption operation set configured with a first polynomial; and
        decrypt encrypted received (Rx) channel data using a decryption operation set configured with a second polynomial that is different from the first polynomial; and
    a security processor configured to:
        select a pairing of the first polynomial and the second polynomial based on a determination that a first power profile associated with the first polynomial differs by at least a threshold power profile differential from a second power profile associated with the second polynomial;
        multiplex the encryption operation set against the decryption operation set with a varied sequence of selection inputs on a round-by-round basis to generate a mixed sequence of encryption rounds and decryption rounds; and
        control the encryption/decryption engine to encrypt the Tx channel data and decrypt the encrypted Rx channel data in a combined data path according to the mixed sequence of encryption rounds and decryption rounds.

2. The SoC of claim 1, wherein the security processor is configured to generate the varied sequence of selection inputs as one of a random sequence, a pseudo-random sequence, or a deterministic sequence.

3. The SoC of claim 1, wherein the security processor is configured to generate the varied sequence of selection inputs as a non-static sequence.

4. The SoC of claim 1,
    wherein the first polynomial comprises a first ground-field polynomial and a first extension-field polynomial,
    wherein the second polynomial comprises a second ground-field polynomial and a second extension-field polynomial,
    wherein the encryption/decryption engine applies the first ground-field polynomial to split 8-bit data blocks of the Rx channel data into respective 4-bit Rx channel data segments,
    wherein the encryption/decryption engine applies the second ground-field polynomial to split 8-bit data blocks of the Tx channel data into respective 4-bit Tx channel data segments,
    wherein the encryption/decryption engine applies the first extension-field polynomial to encrypt a first subset of the 4-bit data segments, and
    wherein the encryption/decryption engine applies the second extension-field polynomial to decrypt a second subset of the 4-bit data segments.

5. The SoC of claim 4, wherein the security processor is further configured to execute a scripting agent to explore a pool of mappings that include a first mapping of the first ground-field polynomial to the first extension-field polynomial and a second mapping of the second ground-field polynomial to the second extension-field polynomial to select the first polynomial and the second polynomial.

6. The SoC of claim 1, wherein the encryption/decryption engine is further configured to:
    execute a byte substitution computational stage of the encryption operation set using finite-field byte substitution; and
    execute an inverse byte substitution computational stage of the decryption operation set using finite-field inverse byte substitution.

7. The SoC of claim 1, wherein the SoC is integrated into one of a head-mounted device (HMD) of an artificial reality system or a peripheral device of the artificial reality system.

8. A head-mounted device (HMD) comprising:
    a system on a chip (SoC) comprising:
        an encryption/decryption engine configured to:
            encrypt transmission (Tx) channel data using an encryption operation set configured with a first polynomial; and
            decrypt encrypted received (Rx) channel data using a decryption operation set configured with a second polynomial that is different from the first polynomial; and
        a security processor configured to:
            select a pairing of the first polynomial and the second polynomial based on a determination that a first power profile associated with the first polynomial differs by at least a threshold power profile differential from a second power profile associated with the second polynomial;
            multiplex the encryption operation set against the decryption operation set with a varied sequence of selection inputs on a round-by-round basis to generate a mixed sequence of encryption rounds and decryption rounds; and
            control the encryption/decryption engine to encrypt the Tx channel data and decrypt the encrypted Rx channel data in a combined datapath according to the mixed sequence of encryption rounds and decryption rounds; and an interface coupled to the SoC, the interface being configured to:

transmit the Tx traffic; and receive the encrypted Rx traffic.

9. The HMD of claim 8, wherein the security processor is configured to generate the varied sequence of selection inputs as one of a random sequence, a pseudo-random sequence, or a deterministic sequence.

10. The HMD of claim 8, wherein the security processor is configured to generate the varied sequence of selection inputs as a non-static sequence.

11. The HMD of claim 8, wherein the first polynomial comprises a first ground-field polynomial and a first extension-field polynomial, wherein the second polynomial comprises a second ground-field polynomial and a second extension-field polynomial, wherein the encryption/decryption engine applies the first ground-field polynomial to split 8-bit data blocks of the Rx channel data into respective 4-bit Rx channel data segments, wherein the encryption/decryption engine applies the second ground-field polynomial to split 8-bit data blocks of the Tx channel data into respective 4-bit Tx channel data segments, wherein the encryption/decryption engine applies the first extension-field polynomial to encrypt a first subset of the 4-bit data segments, and wherein the encryption/decryption engine applies the second extension-field polynomial to decrypt a second subset of the 4-bit data segments.

12. The HMD of claim 11, wherein the security processor is further configured to execute a scripting agent to explore a pool of mappings that include a first mapping of the first ground-field polynomial to the first extension-field polynomial and a second mapping of the second ground-field polynomial to the second extension-field polynomial to select the first polynomial and the second polynomial.

13. The HMD of claim 8, wherein a encryption/decryption engine is further configured to:

execute a byte substitution computational stage of the encryption operation set using finite-field byte substitution; and execute an inverse byte substitution computational stage of the decryption operation set using finite-field inverse byte substitution.

14. A peripheral device comprising:

a system on a chip (SoC) comprising:

an encryption/decryption engine configured to:

encrypt transmission (Tx) channel data using an encryption operation set configured with a first polynomial; and decrypt encrypted received (Rx) channel data using a decryption operation set configured with a second polynomial that is different from the first polynomial; and a security processor configured to:

select a pairing of the first polynomial and the second polynomial based on a determination that a first power profile associated with the first polynomial differs by at least a threshold power profile differential from a second power profile associated with the second polynomial;

multiplex the encryption operation set against the decryption operation set with a varied sequence of selection inputs on a round-by-round basis to generate a mixed sequence of encryption rounds and decryption rounds; and control the encryption/decryption engine to encrypt the Tx channel data and decrypt the encrypted Rx channel data in a combined data path according to the mixed sequence of encryption rounds and decryption rounds; and an interface coupled to the SoC, the interface being configured to:

transmit the Tx traffic; and receive the encrypted Rx traffic.

15. The peripheral device of claim 14, wherein the security processor is configured to generate the varied sequence of selection inputs as one of a random sequence, a pseudo-random sequence, or a deterministic sequence.

16. The peripheral device of claim 15, wherein the security processor is configured to generate the varied sequence of selection inputs as a non-static sequence.

17. The peripheral device of claim 14, wherein the first polynomial comprises a first ground-field polynomial and a first extension-field polynomial, wherein the second polynomial comprises a second ground-field polynomial and a second extension-field polynomial, wherein the encryption/decryption engine applies the first ground-field polynomial to split 8-bit data blocks of the Rx channel data into respective 4-bit Rx channel data segments, wherein the encryption/decryption engine applies the second ground-field polynomial to split 8-bit data blocks of the Tx channel data into respective 4-bit Tx channel data segments, wherein the encryption/decryption engine applies the first extension-field polynomial to encrypt a first subset of the 4-bit data segments, and wherein the encryption/decryption engine applies the second extension-field polynomial to decrypt a second subset of the 4-bit data segments.

18. The peripheral device of claim 11, wherein the security processor is further configured to execute a scripting agent to explore a pool of mappings that include a first mapping of the first ground-field polynomial to the first extension-field polynomial and a second mapping of the second ground-field polynomial to the second extension-field polynomial to select the first polynomial and the second polynomial.

19. The peripheral device of claim 14, wherein the encryption/decryption engine is further configured to:

execute a byte substitution computational stage of the encryption operation set using finite-field byte substitution; and execute an inverse byte substitution computational stage of the decryption operation set using finite-field inverse byte substitution.

* * * * *